IMPROVEMENT IN HIGH SPEED TELEGRAPHIC SYSTEMS

Filed Feb. 13, 1958 14 Sheets-Sheet 1

INVENTOR
GEORGES VALENSI
BY Kurt Kelman
AGENT

Aug. 2, 1960 G. VALENSI 2,947,813

IMPROVEMENT IN HIGH SPEED TELEGRAPHIC SYSTEMS

Filed Feb. 13, 1958 14 Sheets-Sheet 2

INVENTOR
GEORGES VALENSI
BY Kurt Kelman
AGENT

Aug. 2, 1960 G. VALENSI 2,947,813

IMPROVEMENT IN HIGH SPEED TELEGRAPHIC SYSTEMS

Filed Feb. 13, 1958 14 Sheets-Sheet 3

INVENTOR
GEORGES VALENSI
BY Kurt Kelman
AGENT

INVENTOR
GEORGES VALENSI
BY Kurt Kelman
AGENT

Aug. 2, 1960 G. VALENSI 2,947,813

IMPROVEMENT IN HIGH SPEED TELEGRAPHIC SYSTEMS

Filed Feb. 13, 1958 14 Sheets-Sheet 5

INVENTOR
GEORGES VALENSI
BY Kurt Kelner
AGENT

Aug. 2, 1960 G. VALENSI 2,947,813

IMPROVEMENT IN HIGH SPEED TELEGRAPHIC SYSTEMS

Filed Feb. 13, 1958 14 Sheets-Sheet 6

INVENTOR
GEORGES VALENSI
BY Kurt Kelman
AGENT

INVENTOR
GEORGES VALENSI
BY Kurt Kelman
AGENT

INVENTOR
GEORGES VALENSI
BY Kurt Kelman
AGENT

Aug. 2, 1960 G. VALENSI 2,947,813

IMPROVEMENT IN HIGH SPEED TELEGRAPHIC SYSTEMS

Filed Feb. 13, 1958 14 Sheets-Sheet 9

INVENTOR
GEORGES VALENSI
BY Kurt Kelman
AGENT

Aug. 2, 1960 G. VALENSI 2,947,813

IMPROVEMENT IN HIGH SPEED TELEGRAPHIC SYSTEMS

Filed Feb. 13, 1958 14 Sheets-Sheet 10

INVENTOR
GEORGES VALENSI
BY Kurt Kelman
AGENT

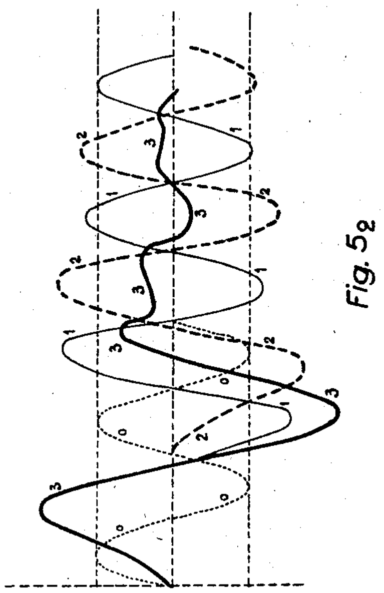
Fig. 5₂
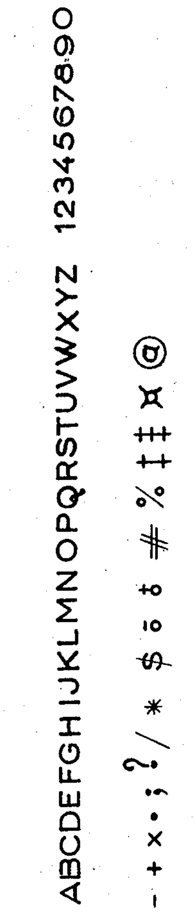
Fig. 5c
INVENTOR
GEORGES VALENSI
BY Kurt Kelman
AGENT INVENTOR
GEORGES VALENSI
BY Kurt Kelman
AGENT Aug. 2, 1960 G. VALENSI 2,947,813

IMPROVEMENT IN HIGH SPEED TELEGRAPHIC SYSTEMS

Filed Feb. 13, 1958 14 Sheets-Sheet 13

INVENTOR
GEORGES VALENSI
BY Kurt Kelman
AGENT

Aug. 2, 1960 G. VALENSI 2,947,813

IMPROVEMENT IN HIGH SPEED TELEGRAPHIC SYSTEMS

Filed Feb. 13, 1958 14 Sheets-Sheet 14

INVENTOR
GEORGES VALENSI
By Kurt Kelman
AGENT

United States Patent Office 2,947,813

Patented Aug. 2, 1960

2,947,813

IMPROVEMENT IN HIGH SPEED TELEGRAPHIC SYSTEMS

Georges Valensi, 3 Rue des Chaudronniers, Geneva, Switzerland

Filed Feb. 13, 1958, Ser. No. 715,037

Claims priority, application France June 27, 1957

10 Claims. (Cl. 178—15)

Figures 1, 2:
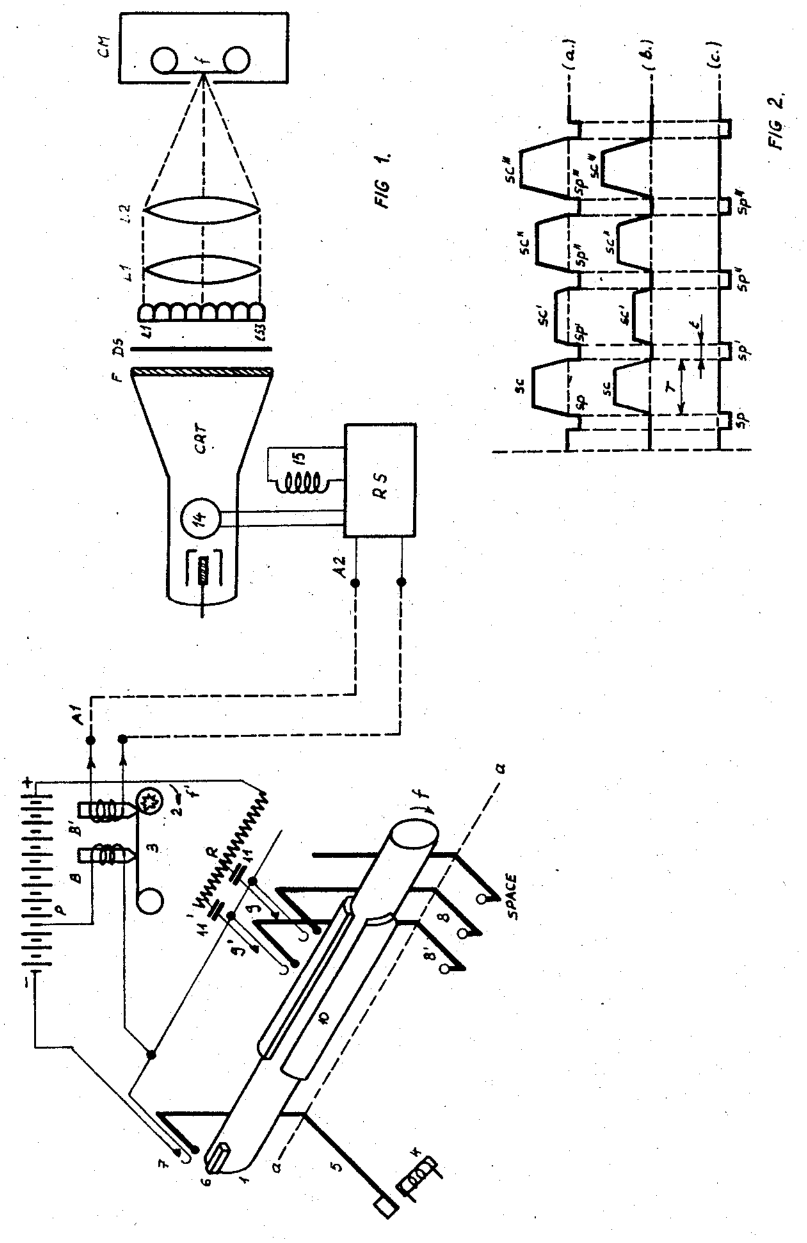
Figure 5H:
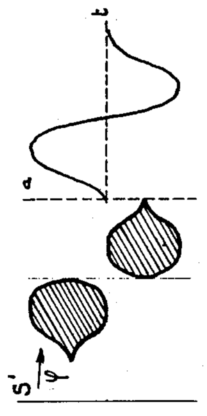
Figure 5G:
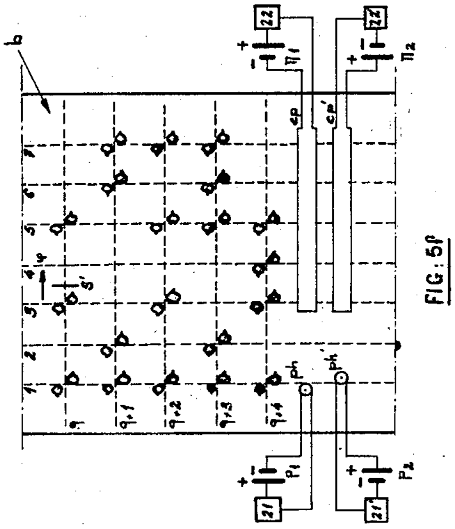
Figure 5A:
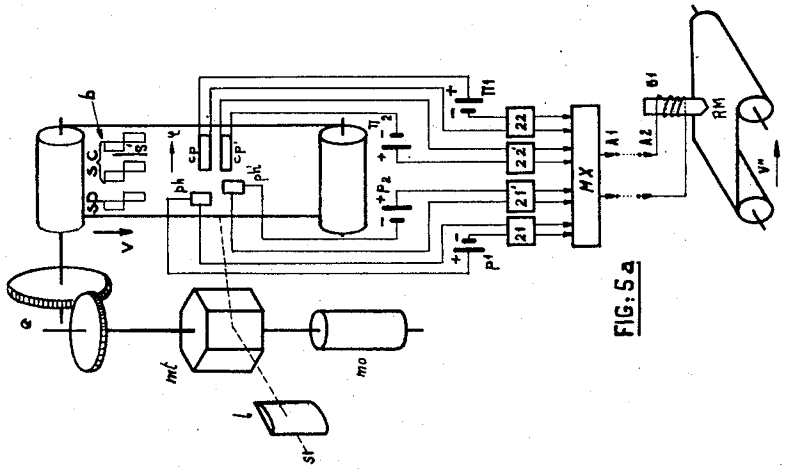

This invention concerns an improvement in the high speed telegraphic systems of the type described in United States Patents Nos. 2,620,394 and 2,732,426 comprising, at the transmitting station (Fig. 1 hereafter), a keyboard similar to that of a typewriter associated with a signaling cylinder 1 adapted to perform one complete rotation for the transmission of one character when a key (such as 8 or 8') is depressed; said cylinder is provided on its periphery (1) with a preliminary control projecting contact 6 adapted to close a contact 7 in the circuit of source P of electrical direct current initiating the transmission of a preliminary signal (*sp, sp', sp''* . . .) for each character, as shown on Figure 2—and (2) with a cylindrical projection 10 (except on one small part corresponding to projecting contact 6), associated with co-linearly positioned contacts for each character depressible into a separate individual position on cylinder 1, and with a potentiometer R connected to source P, whereby a telegraphic code signal (*sc, sc', sc''* . . . Figure 2) is generated when a particular key is depressed—the intensity of said code signal representing the particular character corresponding to said depressed key; these preliminary signals (*sp, sp', sp''* . . .) and code signals (*sc, sc', sc''* . . .) are, by means of coil B, recorded on magnetic tape 3 under the forms of dashes of varying magnetisation. Later these recorded signals are reproduced by coil B' under the form of positive "pips" of various amplitudes followed by negative pips of various amplitudes, which are the derivative (in the mathematical signification of the word) of the signals (*sp, sc, sp', sc'* . . .) represented on Figure 2 (line *a*). These positive and negative short pulses are sent through a telephone circuit $A_1$, $A_2$ to the receiving station RS comprising, at its input, integrating amplifiers (in the mathematical signification of the word) which restore the preliminary signals (such as *sp*) and the code signals (such as *sc*) represented on Figure 2. These restored signals are applied to the vertical (14) and horizontal (15) deflecting coils of a cathode ray tube CRT with a fluorescent or phosphorescent screen F in front of which is located a decoding screen DS bearing 53 columns of 53 characters each (letters, numbers or signs shown on Figure 5*c*); at a given instant the proper character is illuminated by the light produced by tube CRT, and its image (through a multi-lenticular objective $l_1$ . . . $l_{53}$, $L_1$ $L_2$) is produced at the desired place on a photographic film *f* moving inside a camera CM.

A magnetic tape of such a quality that 53 levels of magnetisation can be discriminated is rather costly. Also the unavoidable "envelope delay distortion" of a long distance telephone line distorts sometimes too much the very short pulses with steep front porch (the above mentioned positive and negative "pips"), so that the signals (*sp, sc*) may not be restored satisfactorily at the input of cathode ray tube CRT. Moreover when it is needed to keep, in the files of the transmitting station during a long period of time, records of the sent telegrams, it would be very expensive to use magnetic tapes.

A first object of the present invention is to use a perforated paper tape (instead of a magnetic tape) at the transmitting station; instead of moving in a discontinuous step-by-step manner (like in many existing telegraph apparatus), this perforated paper tape moves in a continuous manner and at a constant speed in relation with the maximum frequency effectively transmitted by the available telephone line, and the holes of this perforated paper tape (instead of being explored by mechanical fingers like in the existing telegraph apparatus) are explored by photoelectronic devices, these holes having such shapes and such relative positions, and being aligned in such a manner, that, when the tape moves, the proper telegraphic signals are generated for each transmitted character at the input of the telephone line.

Figures 5B, 5D, 5E:
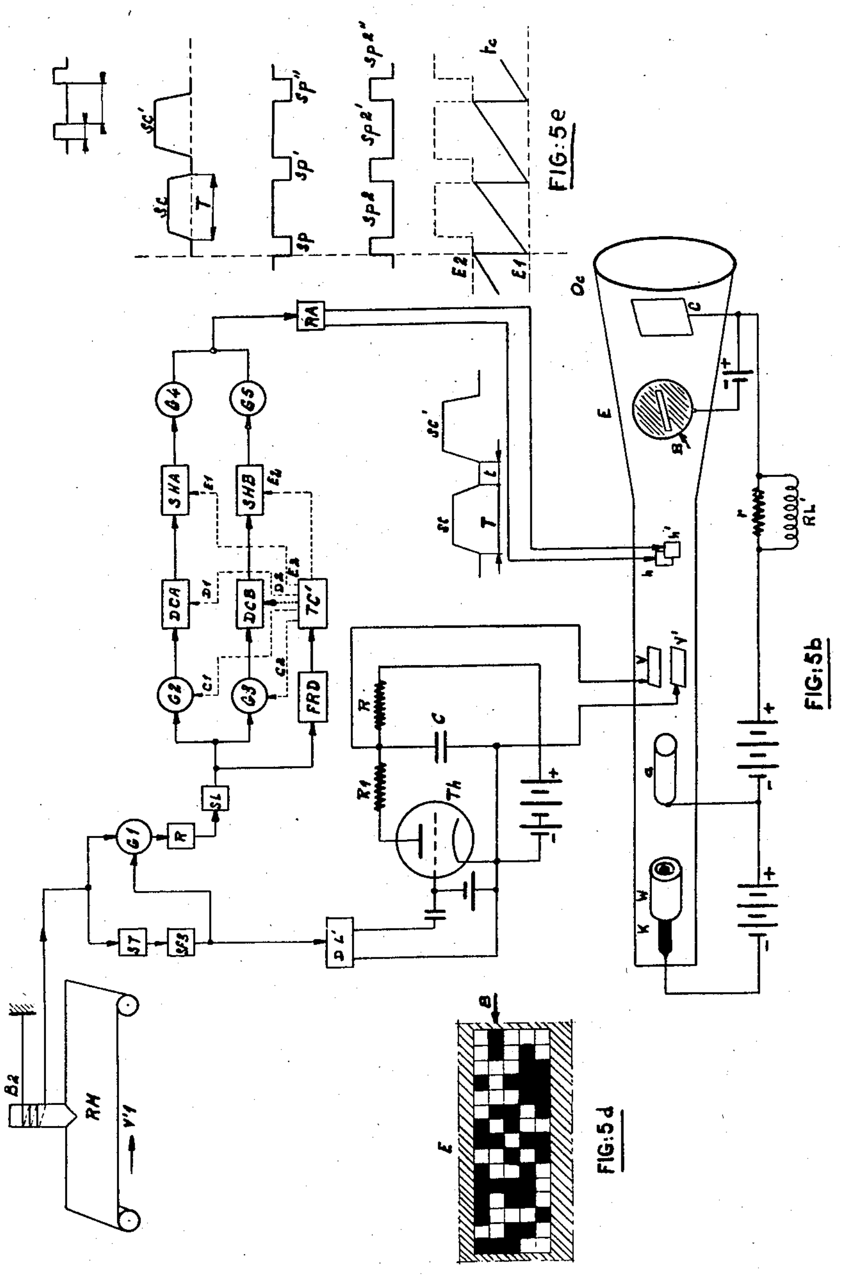
Figure 5K:
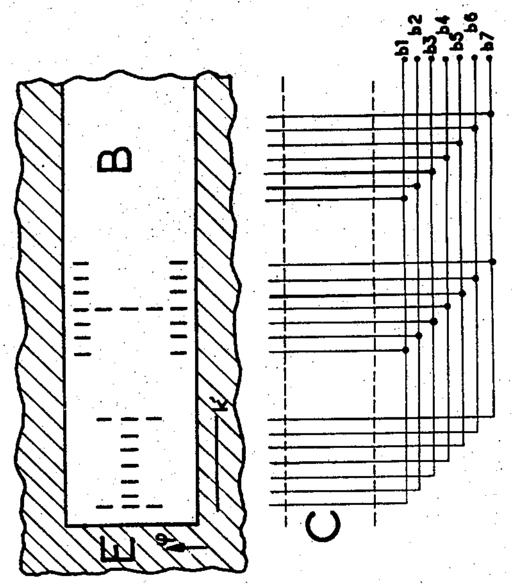
Figure 5J:
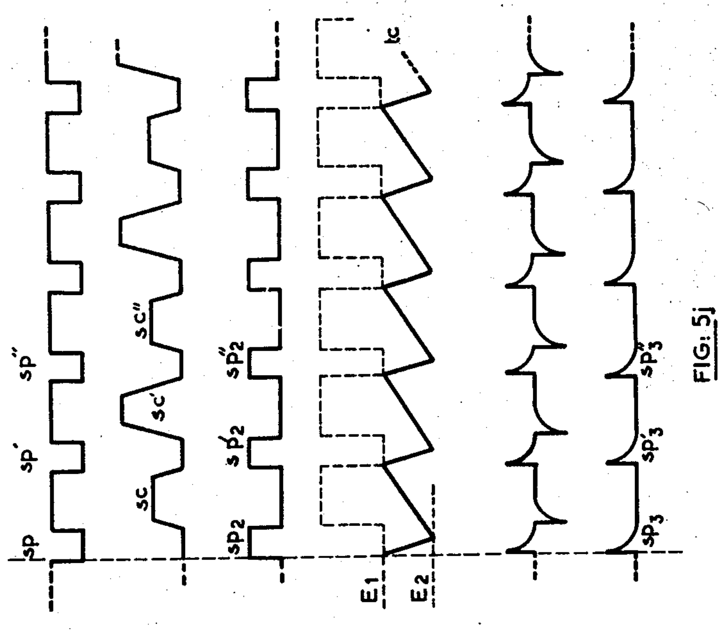
Figure 5I:
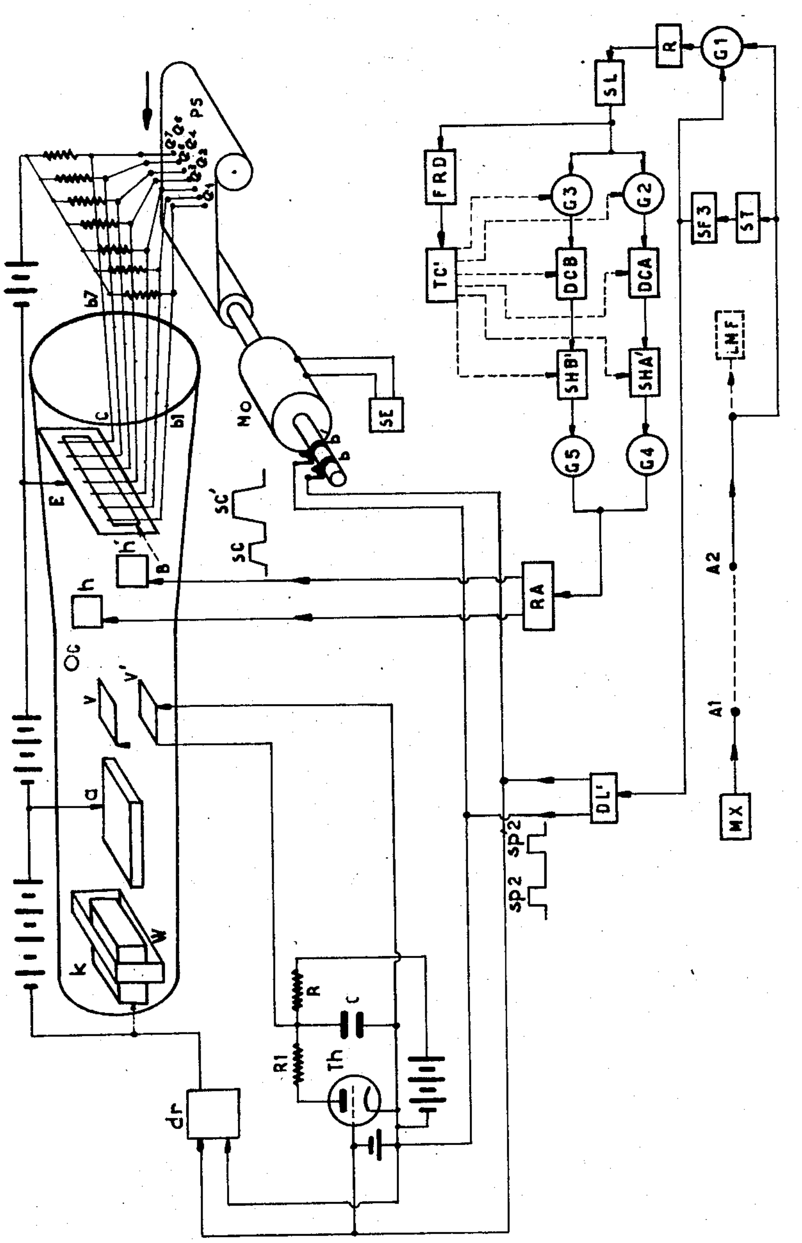

A second object of the present invention is to use, instead of the cathode ray tube CRT, associated with decoding screen DS and multilenticular objective for impressing instantaneously a luminous image of the received telegram on a photographic film (as shown on Figure 1), a "code converting cathode ray tube Oc" (Figures 5*b* and 5*i*) controlling a telegraph receiver printing said received telegram on a paper sheet; use is made either of a usual teleprinter (start-stop type) operating at a low speed (as shown on Figure 5*b*), or a fast operating electrographic printer, the electrodes of which project electrical charges on a special paper, later covered with a special ink powder and heated conveniently. The purpose of this second object of the invention is to avoid (when necessary) the expenses involved in the manufacture of the multilenticular objective (Fig. 1) and the cost of developing photographic films, although continuous developing machines are now available.

The cathode ray tube CRT (Figure 1) may have (as foreseen in U.S. Patents Nos. 2,620,394 and 2,732,426) a fluorescent screen with a very small duration of luminescence, if there is available a very sensitive photographic film *f* having a linearity characteristic (or "gamma") such that the initial and final transient parts of a code signal *sc* (Figure 2) have no action on said film, whereas the desired character is well illuminated during the top horizontal part of said code signal *sc*, and therefore is well impressed on the photographic film; but such a film is not always available and may be sometimes considered too expensive. Therefore a third object of the present invention is to include (in such a cathode ray tube with short duration of the luminescent light) a post-accelerating electrode PAE located near fluorescent screen F and energized by the output of a differentiating-rectifying device DR (see the dotted line between RA and PAE at the bottom of Figure 3), the word "differentiating" having its mathematical significance; this device DR generates (during the initial and final transient parts of each code signal *sc, sc'* . . .) short pulses (or "pips") cancelling the post acceleration of the electrons before they impinge on fluorescent screen F, so that no undesirable luminous action is produced on photographic film *f* during said transient parts of the code signals.

Figure 3:
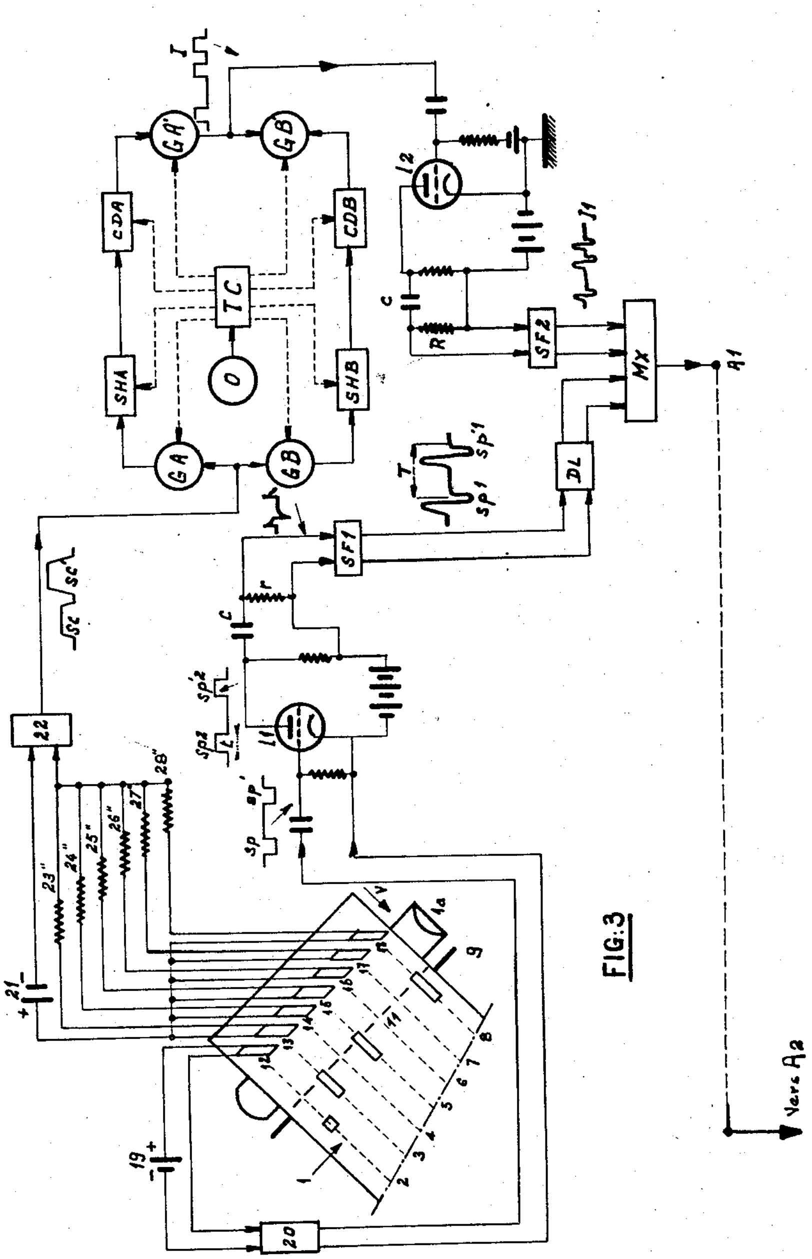
Figure 31:
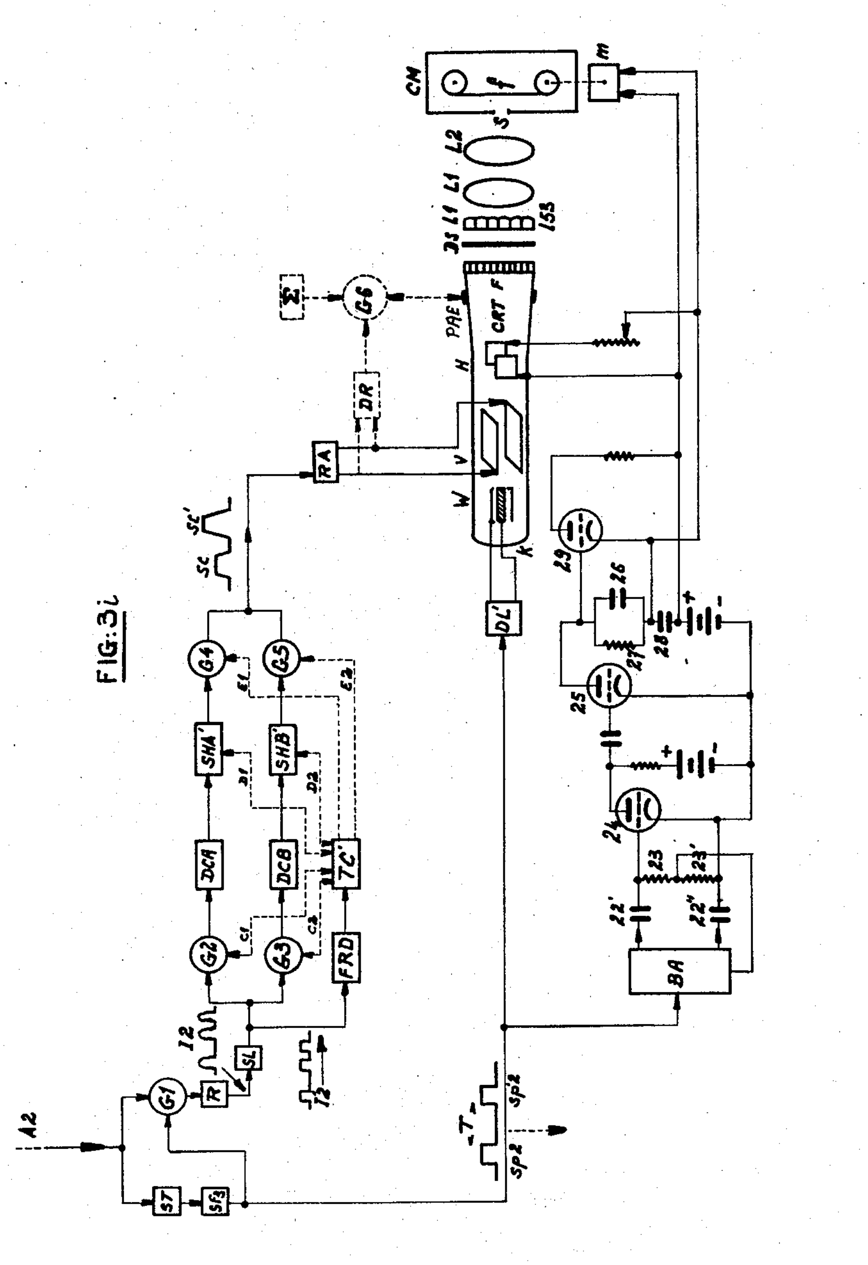
Figure 3B:
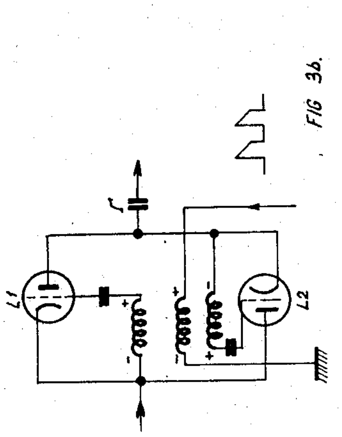

As explained in U.S. Patent No. 2,620,394, when the group of 53 characters building one line of the text of the telegram has been recorded on a magnetic tape (or on a perforated paper sheet, in case of the present invention), the operator at the transmitting station depresses (during a certain period $t_0$) a number of times successively a key (marked "space" on Figure 1) so that no signal at all (either preliminary signal or code signal) is recorded on a certain length of said magnetic tape (or of said paper tape); this has the purpose of producing at the receiving telegraph station (Figure 3), the horizontal return of the cathode ray beam of tube CRT (as explained hereafter in connection with tubes 24, 25 and 29 of Figure 3); an alternative of the third object of the present invention is to use, at the receiving station, a cathode ray tube CRT provided with a phosphorescent screen F (the luminescence of which lasts during the period $t_0$ between two lines of the text of the transmitted telegram), and to use, at said receiving station, a delay line DL' (Figure 3) for delaying the preliminary signal *sp* (applied to the Wehnelt cylinder W of tube CRT), in reference to the associated code signal *sc*, so that the cathode ray beam is allowed to impinge on phosphorescent screen F only during a time *t* (duration of a preliminary signal *sp*) exactly at the middle of the period T of the code signal *sc* applied to the vertical deflecting plates V of tube CRT.

During that time *t*, at the middle of T, the transient initial part of code signal *sc* has elapsed, and the transient final part has not yet begun; the full maximum amplitude of said code signal is applied to plates V and produces a flash of light illuminating the desired character on screen DS; this sudden flash is followed by the phosphorescent light which is integrated, during the period $t_0$, on photographic film *f*.

A fourth object of the present invention is to transform, at the transmitting station the code (shown on Figure 2) including rather long positive pulses *sc, sc', sc''*, in a code involving only short alternative pulses having each a positive half wave immediately followed by a negative half wave, so that the mean current on the line connecting the 2 telegraph stations is zero; moreover each of these two half waves (of opposite polarities) are given, before their transmission on said line, a shape of one systematically predistorted period of a regular sine wave of one of the highest frequencies effectively transmitted by said line, in order to minimize the effect of the envelope delay distortion of said line. To achieve that result, use is made at the transmitting station either of encoding arrangement (of the type used in pulse code modulation) associated with "differentiating amplifiers" and shaping filters (the word "differentiating" having its mathematical significance) or of special perforating needles in punching the paper tape on which are recorded the telegrams to be transmitted.

Instead of using, at the receiving telegraph station, a moving photographic film for recording the luminous images of the received characters, a fifth object of the present invention is to project said luminous images on the photosensitive piece of an electro-photographic printer (or of a xerographic printer) so that, by a dry process, fixed images of said received characters are finally obtained on a paper sheet, which is the received telegram.

The novel features which are considered as characteristic for the present invention are set forth in the appended claims; the invention itself will be best understood from the following description of specific embodiments reading in connection with the accompanying drawings in which:

Figure 1 is an electromechanical device for generating the preliminary signals (*sp*) and the code signals (*sc*) of the basic telegraphic code used in the invention and shown on Figure 2.

Figures 3 and 3*i* show the general lay out of a first embodiment of the invention and represent schematically a telegraphic transmission through a telephone line $A_1$, $A_2$, and comprising: (1) at the transmitting station (shown in Fig. 3), a photoelectronic device scanning a perforated paper tape 1 for generating the code signal *sc* and the preliminary signal *sp* corresponding to each character (letter, number or sign), a differentiating amplifier $1_1$ and a shaping filter $SF_1$ for deriving from said preliminary signal *sp* an alternating pulse of great amplitude $sp_1$, an encoding arrangement for deriving from said code signal *sc* (by the pulse code modulation process) a group of coded pulses I corresponding to the quantized value of said code signal *sc*, a differentiating amplifier $1_2$ and a shaping filter $SF_2$ for transforming said group of coded pulses I in corresponding alternating pulses of small amplitude $I_1$, a delay line DL for bringing, in proper sequence, all these alternating pulses at the output of the transmitting electronic mixer MX—(2) at the receiving station (shown in Fig. 3*i*), a separating tube ST and an electronic gate $G_1$ for separating the group of alternating pulses $I_1$ corresponding to code signal *sc* from the alternating pulse $sp_1$ corresponding to preliminary signal *sp*, a half wave rectifier R for transforming said alternating pulses $I_1$ in positive pulses $I_2$, a shaping filter $SF_3$ for deriving from the separated upper part of the positive half wave of pulse $sp_1$, a rectangular positive pulse $sp_2$ of small duration *t* corresponding to signal *sp*, a slicer SL for transforming the irregular pulses $I_2$ in perfect rectangular pulses $I'_2$, a decoding arrangement (fed by said rectangular coded pulses $I'_2$) for restoring the code signals *sc, sc'* . . . (by the pulse code demodulation process), a cathode ray tube CRT with a luminescent screen F in front of which is located a decoding screen DS bearing the various characters, and a multilenticular objective ($l_1$ . . . $l_{53}$, $L_1$, $L_2$) building luminous images of said characters on a photographic film *f* moving inside a camera CM, the motion of said film *f* being produced by an electric motor *m* synchronized by the received preliminary signals ($sp_2$ corresponding to *sp*).

Figure 3G:
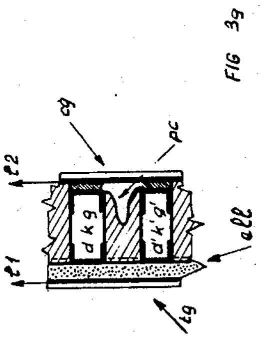
Figure 3A:
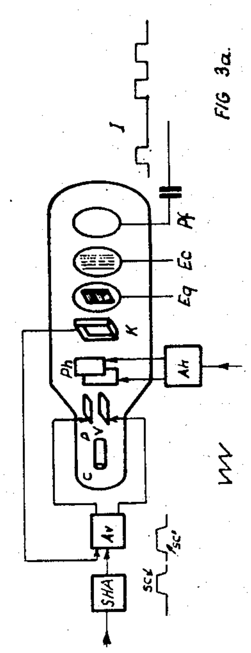
Figure 3C:
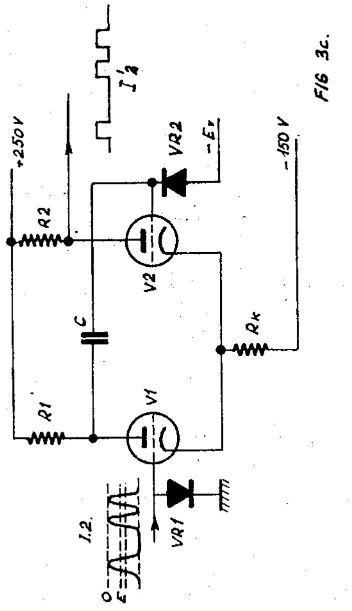
Figure 3D:
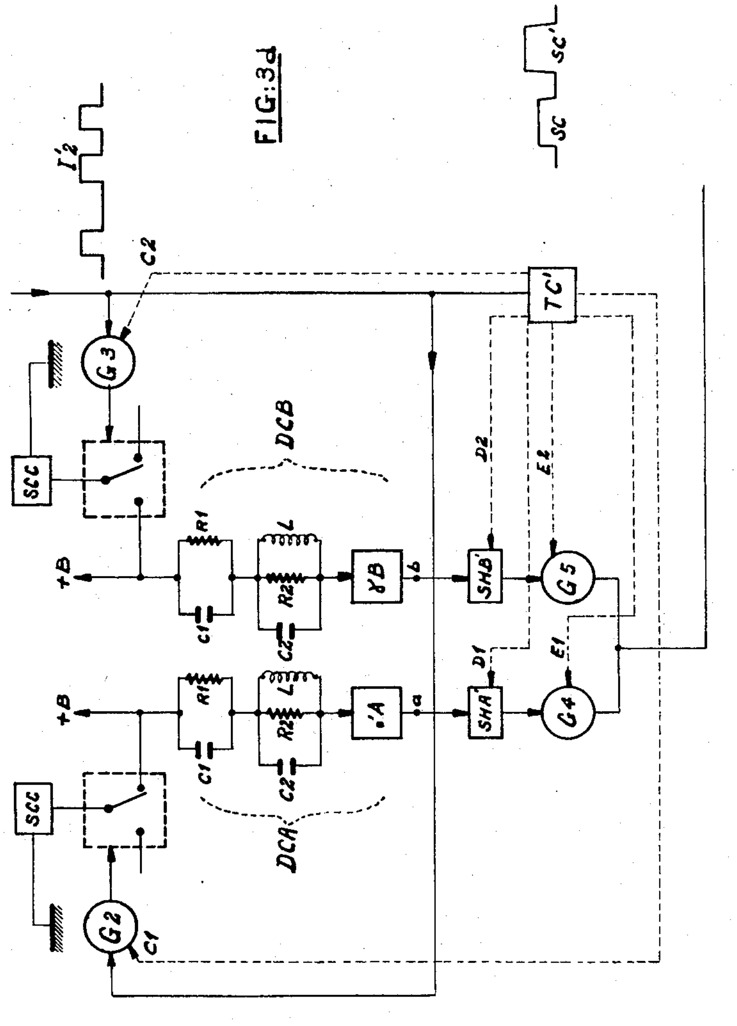
Figure 3F:
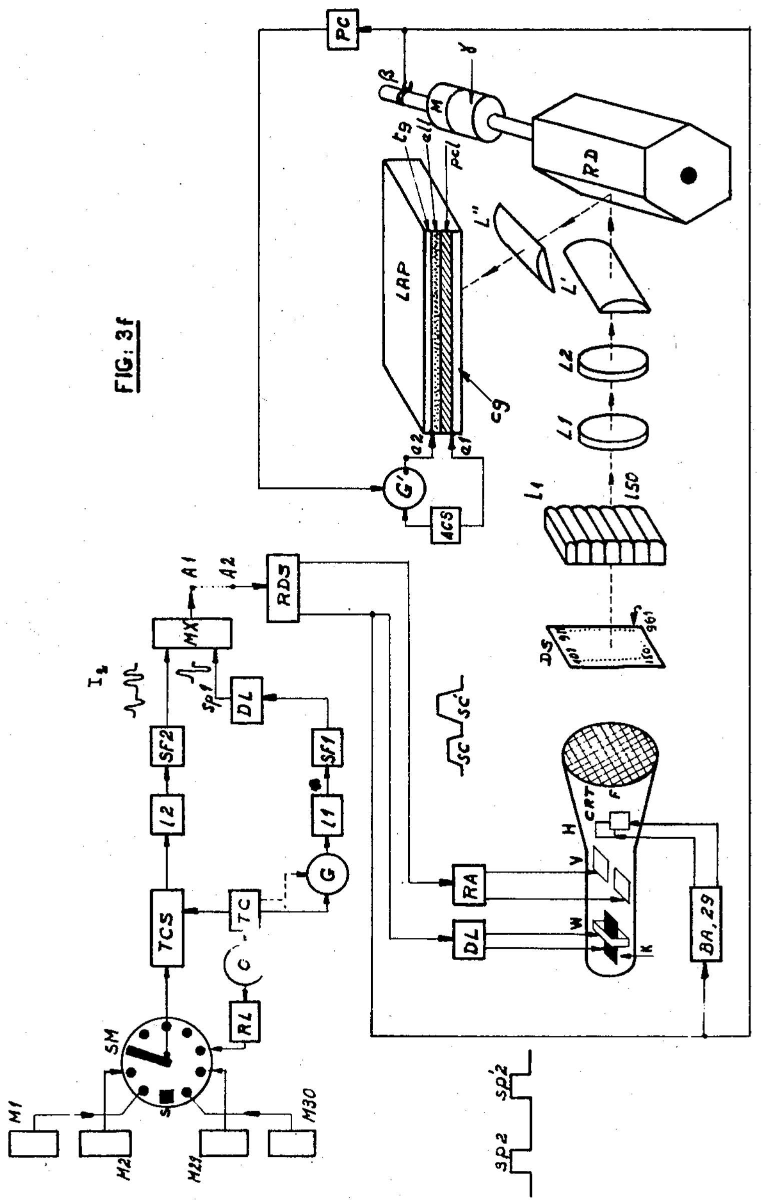
Figure 3H:
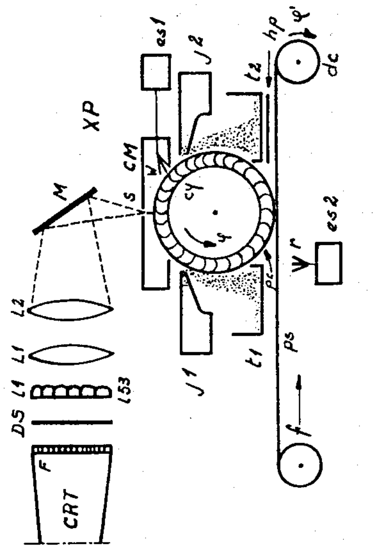
Figure 3E:
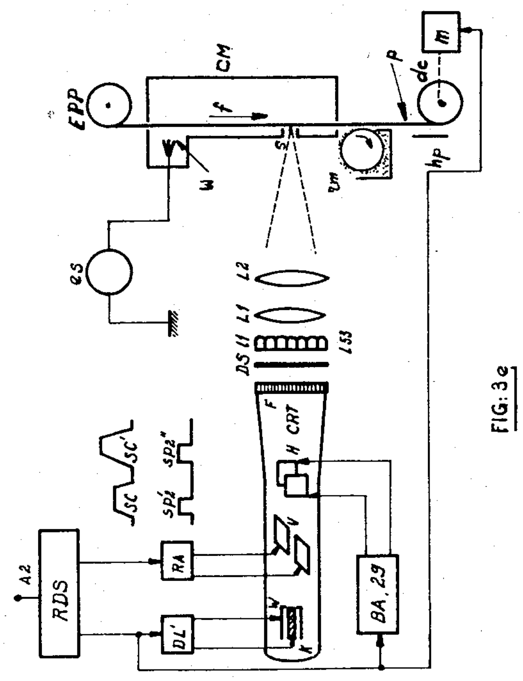
Figures 4, 4B, 4C:
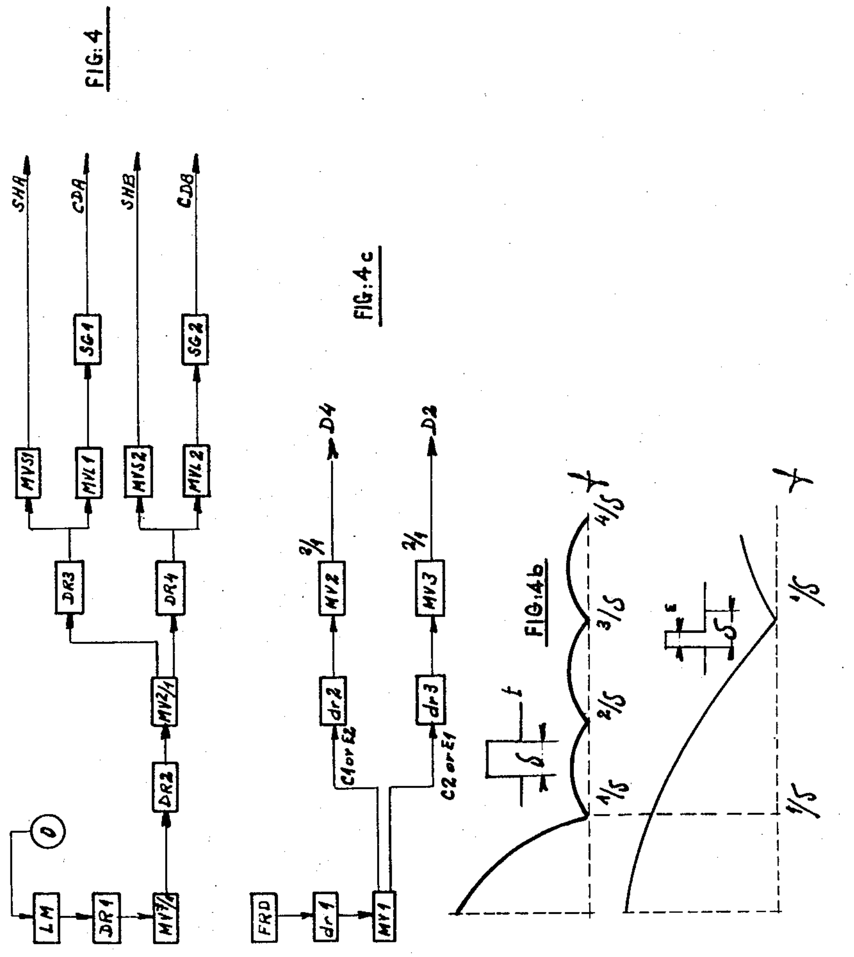
Figures 4A, 4D:
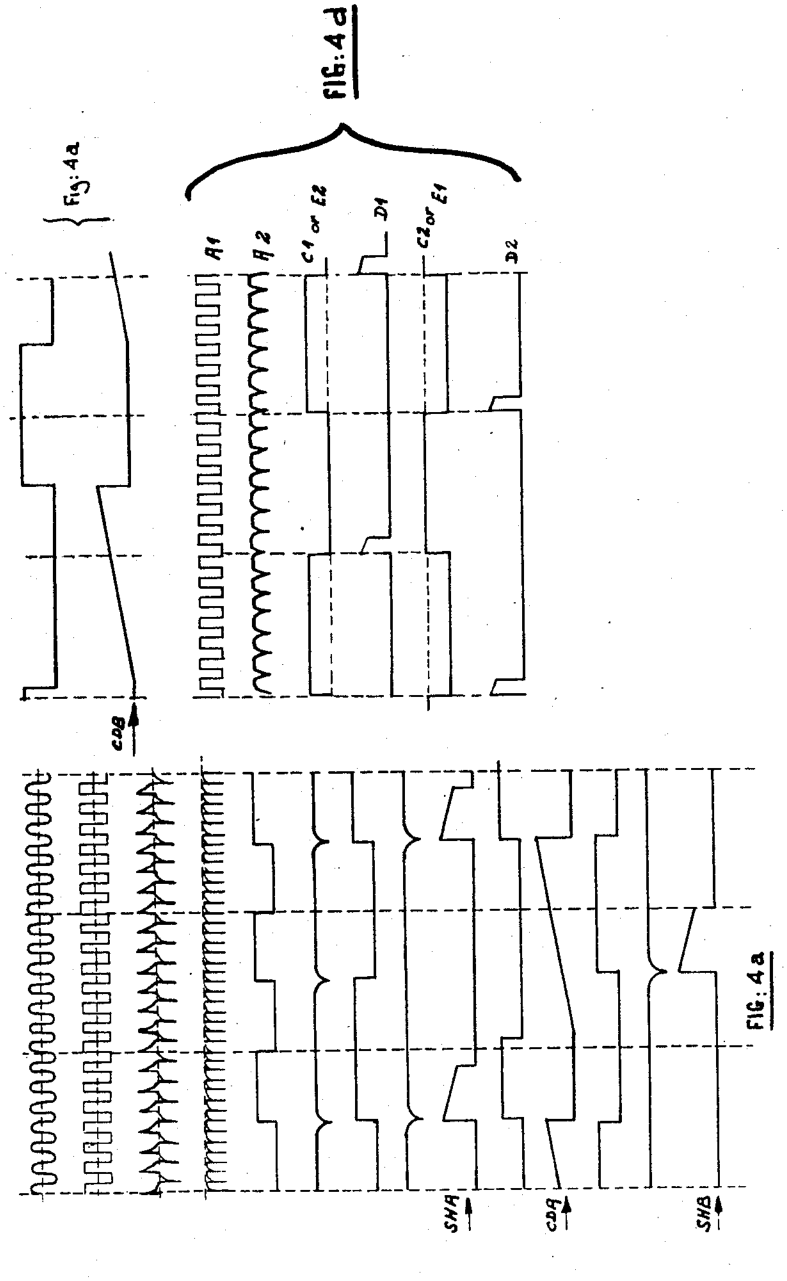

Figure 3–*a* represents a classical beam encoder for pulse code modulation;

Figure 3–*b* represents a sampling and holding device for pulse code modulation;

Figure 3–*c* represents a slicer for transforming irregular pulses in perfect rectangular pulses;

Figure 3–*d* represents in more details the decoding arrangement used at the receiving telegraph station shown on Figure 3;

Figures 3–*e* and 3–*h* illustrate the use (at the telegraph receiving station of Figure 3) of an electrophotographic printer (or of a xerographic printer) instead of a moving photographic film;

Figure 3–*f* illustrates the application of the first embodiment of the invention to remote measuring, the results of the measurements being displayed on a light amplifying panel LAP based on the electroluminescent phenomenon; Fig. 3*g* represents an electroluminescent panel element;

Figure 4 represents the timing circuit TC associated with the encoding arrangement shown on Figure 3 and Figure 4–*a* shows the oscillograms of the various waves generated by said timing circuit TC;

Figure 4–*b* illustrates the performance of the frequency recovering device FRD used at the receiving station and shown on Figure 3;

Figure 4–*c* represents schematically the timing device TC' used at the receiving station of Figure 3, and Figure 4–*d* shows the oscillograms of the various control waves generated by said timing device TC';

Figure 5–*a* and Figure 5–*b* illustrate a second embodiment of the invention, $A_1$, $A_2$ being the telephone line connecting the transmitting and receiving stations; Figure 5–*a* shows a photoelectronic device scanning a perforated paper tape for generating directly the alternating pulse of large amplitude $sp_1$ corresponding to a preliminary signal *sp*, and the alternating pulses of smaller amplitude $I_1$ corresponding (in the pulse code modulation process) to the quantized value of a code signal *sc*; Figure 5–*a* shows also a magnetic tape recorder for recording on magnetic tape RM at great speed said alternating pulses with coil $B_1$ at the end of the telephone line; Figure 5–*b* shows the magnetic tape RM moving (afterwards) at low speed in front of a reproducing coil $B_2$ which feeds the decoding arrangement for restoring the code signal *sc*, and also a telegraphic code converting cathode ray tube Oc transforming said code signal *sc* in the proper set of five pulses energizing the receiving relay RL' of a conventional teleprinter apparatus, which prints slowly the received telegrams on a paper sheet.

Figure 5–*c* shows the 53 different characters used either for telegrams, or for the control of electronic digital computers.

Figure 5–*d* shows a part of the coding electrode E of the telegraphic code converting cathode ray tube Oc of Figure 5–*b*, and Figure 5–*e* illustrates the performance of said tube Oc when energized by the preliminary signals (*sp*) and the code signals (sc).

Figure 5–*f* represents a modified form of the perforated paper tape shown on Figure 5–*a*.

Figure 5–*g* illustrates the effect of envelope delay distortion during the transmission over a telephone line of one period of a regular sine wave.

Figure 5–*h* shows the shapes given to the holes of paper tape *b* (shown on Figure 5–*a*) in order to minimize the effect of said envelope delay distortion.

Figure 5–*i* shows the receiving station of the second embodiment of the present invention in which the alternating pulses ($sp_1$—$I_1$) generated at the telegraph transmitter are directly applied (through the telephone line $A_1$, $A_2$ and the decoding arrangement restoring the code signal *sc*) to a telegraphic code converting cathode ray tube Oc transforming said code signal *sc* in the 5 proper sets of 7 pulses energizing (in 5 successive steps) the 7 electrodes of an electrographic printer which prints, at great speed, the received telegram on a special paper, which is later covered by a special powdered ink, and then conveniently heated.

Figure 5–*k* shows in detail the code converting electrode E and the collecting electrode C of telegraphic code converting cathode ray tube Oc shown on Figure 5–*i*, and Figure 5–*j* illustrates the operation of said tube Oc.

Figure 1 is very similar to Figure 8 of U.S. Patent No. 2,620,394 and differs mainly by 2 points. Firstly, capacitors (11, 11′) are inserted in the connections between the contact springs (9, 9′) [associated with the various keys (8, 8′) of the keyboard] and resistor R; secondly it is assumed that said keyboard comprises 53 keys, each corresponding only to one of the 53 characters (letters, numbers or signs shown on Figure 5–*c* and used either in the written telegrams or for the remote control of electronic digital computers). The purpose of inserting capacitors of appropriate capacity (such as 11, 11′ . . . ) in the circuits generating the code signals (*sc*, *sc′*, *sc″* . . . Figure 2) of different amplitudes is to give the same rise time to all the transient initial parts (and also the same decay time to all the transient final parts) of said code signals, so that their horizontal parts will all have the same duration T. As each key is devoted to only one character (either a letter, or a number, or a sign), it is no more necessary to have a key marked "letters" and a key marked "numbers" for generating signals announcing respectively a transmission of letters, or a transmission of numbers or signs. Therefore the cathode ray tube CRT (Figure 1) has only one cathode ray beam, whereas, on Figure 8 of U.S. Patent No. 2,620,394, it had two beams separated by a metallic partition (across the tube) and corresponding respectively to the upper part of decoding screen DS comprising only letters, or to the lower part of said screen comprising only numbers or signs. The signals announcing letters or numbers (which in U.S. Patent No. 2,620,394 were rather long trains of oscillations of different frequencies) are no more necessary, and therefore there is a substantial gain of time in case of telegrams containing mixtures of letters and numbers. On the other side, the number of different amplitude levels of the code signals (*sc*, *sc′*, *sc″* . . . Figure 2) is nearly doubled (53 instead of 27)—but as these different levels are transformed (as explained hereafter) in groups of short coded pulses by the pulse code modulation process, only one more coded pulse is necessary (because $2^5=32$ and $2^6=64$).

In accordance with the present invention, the keyboard comprising 53 keys (for the 53 characters shown on Figure 5–*c*) controls a perforator (of the type commonly used in telegraphy) which produces, for each character, in a paper tape, holes corresponding respectively to the preliminary signal *sp* and to the code signal *sc* alloted to said character in the basic telegraphic code represented on Figure 2.

In the case of the first embodiment of the invention represented on Figs. 3 and 3*i*, a first hole (corresponding to the preliminary signal *sp*) is perforated on line 2 of said paper tape 1, and immediately after, holes corresponding to the associated code signal *sc* (not exceeding 6 in their group), are perforated on lines 3 to 8 of said paper tape 1. In the case of Figure 3, the latter holes are located on lines 3, 5 and 8; for another character, another arrangement of the holes would be used. When the 53 characters building one line of the text of the telegram to be transmitted have so been dealt with, the operator depresses (during a period $t_0$) a number of times successively, a key marked "space"; the paper tape moves along a certain length whereas the perforator remains idle, so that no hole is perforated on said length of said paper tape; then the operator proceeds to the following line of the text of the telegram.

When all the telegrams to be transmitted have so been recorded on paper tape 1, the operator connects her telephone to the origin $A_1$ of a telephone line; she advises somebody at the end $A_2$ of said line that telegrams are going to be transmitted and that the line should be connected to the telegraph receiver. Then the operator at the transmitting station substitutes, to her telephone apparatus, the photoelectronic device shown on the left at the top of Figure 3.

By means of a motor not shown on Figure 3, the perforated paper tape 1 is put in continuous motion, at a constant speed related to the width of the band of frequencies effectively transmitted by the telephone circuit $A_1$, $A_2$ as explained hereafter. A luminous source, represented schematically as an incandescent wire 9, produces rays of light condensed by cylindrical lens 10 successively on the transversal lines of paper tape 1 (such as line 11, represented as a dotted line). Seven phototransistors, numbered 12 to 18, are located, relatively to tape 1, in such a manner that they receive a luminous flux from source 9 if they are in front of a hole on tape 1; for example, on Figure 3, the phototransistors 13, 15 and 18 are so illuminated, and therefore become electrically conducting. On the contrary, phototransistors 12, 14, 16 and 17, which do not receive any light, behave like high resistances.

Phototransistor 12 is inserted in a circuit comprising the direct current generator 19 and connected to amplifier 20. Every other phototransistor (13 to 18) is connected to direct current generator 21 and to amplifier 22 through a resistor (23″ to 28″); the resistances of said resistors 23″ to 28″ are in the following relative proportions, the value of R being such that R/32 is large compared to the other resistances in the same circuit: resistance 28″$=R$; resistance 27″$=R/2$; resistance 26″$=R/4$; resistance 25″$=R/8$; resistance 24″$=R/16$; resistance 23″$=R/32$. If $E_2$ is the electromotive force of source 21, it is apparent on Figure 3, that, at the input of amplifier 22, the electric current has the following intensity:

$$i=\frac{E_2}{R}+\frac{E_2}{R/8}+\frac{E_2}{R/32}=\frac{E_2}{R}\times 41$$

It is assumed that this value $$\frac{E_2}{R}\times 41$$

corresponds to the amplitude of the particular code signal *sc* (Figure 2) related to the character for which precisely the arrangement of holes in paper tape 1 is the one represented on Figure 3.

In the case of Figure 3, there is no current in the circuit of source 19; but if, on the contrary, phototransistor 12 were in front of a hole on line 2 of tape 1, it would become conducting, and amplifier 20 would deliver a negative pulse of current such as *sp* (Figure 2).

The amplitude of the preliminary signals (*sp*, *sp'* . . .) is the same for all of them, and the corresponding holes (aligned on line 2 of tape 1) are the same and have the same dimensions. If (for the transmission on the telephone line) tape 1 moves in front of the phototransistors (Figure 3) with a constant speed of *v*, if *t*, is the duration foreseen for a preliminary signal *sp*, the length $l_p$ of hole on line 2 (Figure 3) should be: $l_p=vt$. If T is the duration foreseen for a code signal *sc*, the length $l_c$ of the holes on lines 3 to 8 (Figure 3) should be: $l_c=vT$.

The number and arrangement of the holes on lines 3 to 8 for a given code signal *sc* depend on the amplitude of said signal *sc*; they are naturally different for the various code signals (*sc*, *sc'*, *sc''* . . .) corresponding to the 53 characters (letters, numbers, or signs) which may be transmitted (see Figure 5–*c*).

The width of the holes (which is the same for all the holes on the perforated paper tape) must be such that the luminous flux produced through the hole is sufficient to unblock (or make conducting) the corresponding phototransistor.

The preliminary signals *sp*, *sp'* at the output of amplifier 20 are applied to triode $l_1$ having (at its output) a circuit made of resistor *r* and capacitor *c* such that the time constant (*rc*) is small compared to the duration *t* of a preliminary signal. At the front porch of the positive pulse $sp_2$, obtained at the output of $l_1$, capacitor *c* charges rapidly under the full voltage of $sp_2$, and a positive "pip" is obtained, because, when the charging of *c* is completed, no current circulates in resistor *r*. Similarly a negative "pip" obtained at the back porch of $sp_2$. These "pips" are applied to shaping filter $SF_1$, so that finally an alternating pulse $sp_1$ of large amplitude and of duration *t* is obtained, having a first positive half wave followed by a negative half wave, in the form of one predistorted period of a regular sine wave, as explained later in connection with Figures 5–*g* and 5–*h*.

These alternating pulses such as $sp_1$ are applied, through delay line DL, to electronic mixer MX.

The code signals *sc*, $sc_2$, *sc''* . . . produced by amplifier 22 are applied to an encoding arrangement (controlled by a stable oscillator O feeding a timing circuit TC) including: in a first branch an input electronic gate GA, a sampling and holding device SHA, a beam coder CDA (of classical type in pulse code modulation, represented on Figure 3–*a*) and an output electronic gate GA'—whereas the second branch comprises similar organs GB, SHB, CDB and GB'.

The performance of an encoding device such as (GA—SHA—CDA—GA') used in pulse code modulation takes some time; it is also the same for the corresponding decoding device ($G_2$—DCA—SHA'—$G_4$) at the bottom of Figure 3; also the encoding operations should be accurately timed, as well as the decoding operations. For these reasons two beam coders (CDA, CDB) at the transmitting station deal respectively with the odd and the even code signals *sc*, *sc'* . . . (Figure 2), and are controlled by timing circuit TC; a similar timing circuit TC' at the receiving station controls the two corresponding decoders (DCA, DCB), and is energized by a "frequency recovering device (FRD)" reproducing the frequency of the train of coded pulses I.

The output of the two-branch encoding arrangement is made of these groups of positive coded pulses I which are transformed (by a differentiating amplifier $l_2$, feeding a circuit RC of very small time constant, and afterwards by a shaping filter $SF_2$) in alternating pulses $I_1$ of small amplitude, which are also applied to electronic mixer MX.

The delay line DL retards the alternating pulse of great amplitude $sp_1$ corresponding to preliminary signal *sp* in order to give to $sp_1$ a time position immediately before the group of coded pulses $I_1$ (corresponding to the code signal *sc* following preliminary signal *sp*) at the input of mixer MX.

The mixture ($sp_1$, $I_1$) corresponding to each transmitted character is sent, through the telephone circuit $A_1$ $A_2$, to the distant receiving station.

At the end $A_2$ of the telephone circuit, this mixture is applied simultaneously to two channels; on the first channel a separating tube ST (triode having a grid bias corresponding to the smaller amplitude of the pulses $I_1$) acts as an "amplitude filter" and suppresses every thing, except the top of the positive half wave of each alternating pulse $sp_1$ corresponding to a preliminary signal *sp*. These positive narrow pulses, spaced from each other (in time) by the duration T of a code signal *sc*, are applied to a shaping filter $SF_3$ producing rectangular positive pulses $sp_2$, $sp'_2$ . . . also spaced in time by T; said pulses $sp_2$, $sp'_2$ . . . are applied, through delay line DL', to the cathode K and the Wehnelt cylinder W of a cathode ray tube CRT provided with a phosphorescent screen F (the device DR and the post accelerating electrode PAE represented in dotted lines on Figure 3 being then supposed omitted).

Said positive pulses $sp_2$, $sp'_2$ . . . (spaced in time by T) control, at the end $A_2$ of the telephone line, the electronic gate $G_1$ located at the entrance of the second channel in such a way that only the received alternating coded pulses $I_1$ (corresponding to the code signals *sc*, *sc'* . . .) are allowed to reach a rectifier R which leaves, at its output, only the positive half waves $I_2$ of these received alternating pulses $I_1$. Due to unavoidable distortion in the telephone line $A_1$, $A_2$, the received coded pulses ($I_1$) have some irregular forms. It is therefore necessary to apply these irregular positive pulses $I_2$ to "slicer SL," which has the duty to produce perfect rectangular coded pulses $I'_2$ at its output.

These rectangular coded pulses $I'_2$ (at the output of slicer SL) are applied to a two-branch decoding arrangement, controlled by the "frequency recovering device FRD" feeding the timing circuit TC', and comprising, in the first branch, an input electronic gate $G_2$, a decoder DCA, a sampling and holding device SHA' and an output electronic gate $G_4$, whereas the second branch comprises similar organs: gate $G_3$, decoder DCB, sampling and holding device SHB' and gate $G_5$. This two-branch-decoding-arrangement restores the code signals *sc*, *sc'*, *sc''*, *sc'''* . . . by means of the well known pulse decoding process, encoder CDA and decoder DCA dealing with the odd code signals *sc*, *sc''* . . . , whereas encoder CDB and decoder DCB deal with the even code signals *sc'*, *sc'''* . . . .

The code signals *sc*, *sc'*, *sc''*, *sc'''* . . . so restored in the telegraph receiver (by decoders DCA and DCB alternatively) are applied through receiving amplifier RA (Figure 3), to the plates V for vertical deflection of the cathode ray beam in tube CRT; the received preliminary signals ($sp_2$, $sp'_2$, $sp''_2$, $sp'''_2$ . . .) are applied to delay line DL', the output of which is connected to cathode K and Wehnelt cylinder W of tube CRT. The delay introduced by said delay line DL' is such that the cathode ray beam in tube CRT is cut off, except during a small interval of time *t*, exactly at the moment when the full amplitude of a restored code signal *sc* is applied to deflecting plates V of tube CRT; at that moment, a point of phosphorescent screen F illuminates the particular character (in a certain column of decoding screen DS, Figure 3*i*) which corresponds to the code signal *sc* (acting on plates V of tube CRT at said moment).

Decoding screen DS is opaque, except for the 53 characters (letters, numbers and signs) of each of its 53 columns. The optical system, interposed between decoding screen DS and the moving photographic film *f*, inside camera CM, comprises: (1) a reticulated network of 53 plano-convex lens elements $l_1$, $l_2$ . . . $l_{53}$ (separated from each other by opaque coatings), located quite close to decoding screen DS, (2) an achromatic lens system $L_1$ located at a small distance from said reticulated network of lens elements, so that any line ($k$) of screen DS is at the focus of the optical arrangement constituted by $L_1$ and the corresponding lens element $l_k$, and (3) another achromatic lens system $L_2$, at the focus of which is located the slot $s$ in the front wall of camera CM, behind which moves the photographic film $f$, driven by an electric motor $m$ synchronized by the pulses $sp_2$, $sp'_2$ . . . corresponding to the preliminary signals.

The purpose of this optical system ($l_1$ . . . $l_{53}$, $L_1$, $L_2$) is to superpose (on said slot $s$ in camera CM) the images of the 53 lines of decoding screen DS; therefore while the letters illuminated successively on the various columns of screen DS are located on different lines of said screen DS, their luminous images will be aligned on the same line of photographic film $f$, through slot $s$ in the front wall of camera CM, and will constitute one line of the received telegram; this telegram, after developing film $f$, will have the appearance of black letters on a white paper sheet.

The pulses $sp_2$, $sp'_2$, $sp''_2$ . . . corresponding to the received preliminary signals are also applied to a device controlling the horizontal deflection of the cathode ray beam of tube CRT (Figure 3$i$), by means of deflecting plates H; said device is constituted by tubes 24, 25 and 29, and performs the operations explained in U.S. Patent No. 2,620,394 with reference to Figure 10 of said patent.

At the output of a balanced push-pull amplifier BA, capacitors 22' and 22' and resistors 23 and 23' form a differentiating circuit (in the mathematical sense of the word) producing an impulse during each preliminary signal ($sp_2$, $sp'_2$ . . .). These impulses are amplified by the triode valve 24, which is so arranged that its output consists of amplified impulses rendering always positive the grid of the following valve 25; this latter grid is normally biased below the lower bend of the characteristic. In the output circuit of valve 25 is an arrangement of a resistor 27 in parallel with a capacitor 26, having a predetermined time constant, and this arrangement itself is in series with another capacitor 28. Said capacitor 28 accordingly receives (at the moment of each preliminary signal $sp_2$) an additional charge, so that the voltage between its electrodes is gradually increased by successive jumps; it is just this voltage which supplies (through a regulating resistance) the deflecting plates H producing the horizontal deflection of the cathode ray beam in tube CRT; it also synchronises the motion of motor $m$ driving film $f$. The arrangement formed by resistor 27 and capacitor 26 controls, on the other hand, the polarization of the grid of a gas filled electric discharge tube (or thyratron) 29. The time constant of the circuit 27, 26 is so chosen that there is no interruption during the transmission of the preliminary signals ($sp_2$, $sp'_2$, $sp''_2$, etc.), and, as a result the potential of the thyratron grid remains below the ignition point of the electric discharge through the gas.

When a group of 53 characters (constituting one line of the text of the telegram) has been transmitted, the preliminary signals $sp$ cease during a certain time $t_0$ (as explained above), and at this moment, due to the value given to the time constant of the circuit 27, 26, the negative control grid bias voltage of the thyratron 29 is reduced sufficiently to cause a discharge, whereupon capacitor 28 discharges itself rapidly. The thyratron 29 thus plays the role of a rapid interrupter switch, closing at an accurately determined instant due to appropriate choice of the time constant of this circuit 27, 26, and this closing continues during a short time $t_0$ equal to the duration $t_0$ of the suppression of the preliminary signals $sp$ between two successive lines of the text of the telegram. During that period $t_0$, the phosphorescent light produced by screen F is integrated on film $f$.

In Figure 3$i$ is represented (in dotted lines) a device DR acting on a post-accelerating electrode PAE, said device DR and said electrode PAE being used only in the case where screen F (of cathode ray tube CRT) is fluorescent, that is to say has a very small duration of the luminescent light produced when electrons impinge on it. This device DR is fed by the restored code signal $sc$ which is, at the same time, applied to deflecting plates V; this device DR controls the connection between a source $\Sigma$ of very high potential (referred to cathode K) and post accelerating electrode PAE, by means of an electronic gate $G_6$ (represented on Figure 3$i$). The (mathematically) differentiating action of a code signal $sc$ by means of DR produces a positive "pip" during the initial transient part of $sc$ and a negative "pip" during the final transient part of $sc$, whereas the output voltage of DR remains constant during the time T when $sc$ keeps its maximum amplitude; the device DR (after having eventually made uniform the amplitudes of said "pips" and reversed the polarity of the negative ones) acts (by the two short pulses of same polarity so obtained) on said electronic gate $G_6$ for cutting (during these transient initial and final parts of $sc$) the connection between the source $\Sigma$ of high potential and the post accelerating electrode PAE. Therefore no undesirable luminous action is produced on photographic film $f$ during said initial and final transient parts of restored code signal $sc$, whereas the luminous image of the desired character (corresponding, on decoding screen DS, to said signal $sc$) is well impressed on photographic film $f$ during the period T when (said signal $sc$ keeping the same maximum amplitude) the electron beam remains on screen F in front of said desired character.

In order to explain in more details the performance of the encoding arrangement of the transmitting station and of the decoding arrangement of the receiving station (Figs. 3 and 3$i$), schematic diagrams of their constituting parts are appended.

Figure 3–$b$ represents a "sampling and holding device" such as SHA, SHB, SHA' and SHB' on Figs. 3 and 3$i$; it comprises two triodes $L_1$ and $L_2$, the plate-cathode spaces of which are connected in parallel, but are conducting in opposite directions; the grids of said triodes are polarised below "cut-off" during the opening of the sampler, whereas these grids become very positive under the action of a control pulse generated by timing circuit TC at the moment where a low resistance path must be established between the input of the sampler and its output. The sloping bar at the top of each control pulse, represented at the right of Figure 3–$b$, is a predistortion such that, after going through the transformer TR, perfect rectangular pulses are applied to triodes $L_1$ and $L_2$. The holding capacitor Γ retains the sample of voltage taken by the sampler.

Figure 3–$a$ represents schematically the beam coder (CDA or CDB) fed by the sampling and holding device (SHA or SHB). The sample of voltage hold by the output capacitor of SHA (which is an odd code signal $sc$) is applied at the input of amplifier $A_v$ producing (by means of plates $P_v$) the vertical deflection of the cathode ray beam of an "encoding tube" (CDA) embodying also an electron gun C, two plates $P_h$ for the horizontal deflection of said cathode ray beam under the action of a saw-tooth electric wave generated by timing circuit TC (see hereafter), a secundary electrons collector K, a quantizing electrode $E_q$, an encoding electrode $E_c$ (also called "aperture mask"), and a final plate $P_f$ which collects the coded pulses I (see Figure 3) corresponding to the applied code signal $sc$, and produced by the electrons passing through the holes of $E_c$.

The quantizing electrode $E_q$ is a grid of thin horizontal wires parallel to each other and so placed that one wire (as viewed by the beam) lies between each adjacent group of apertures (or holes) of $E_c$ corresponding to a particular character (letter, number or sign) in a binary code. Reasonable accurate quantization of the amplitudes of the code signals *sc, sc', sc''* . . . and correct encoding are obtained by means of this quantizing electrode $E_q$, and also by means of the feedback path between collector K and amplifier for vertical deflection $A_v$.

Figure 3–*c* represents slicer SL (of Figure 3*i*), which transforms irregular pulses $I_2$ applied to its input in perfect rectangular pulses $I'_2$. It comprises two triodes (valve $V_1$ and valve $V_2$); capacitor C inserted between the plate of $V_1$ and the grid of $V_2$ has a sufficient capacity so that the voltage across its armatures does not vary substantially, and resistance $R_1$ is small enough so that the gain of the feed-back path will be nearly equal to 1 when the two triodes $V_1$ and $V_2$ are active.

The germanium varistors $VR_1$, $VR_2$ maintain appropriate grid bias, whatever the number of coded pulses $I_2$ (or the intervals between successive pulses $I_2$) may be. Each time the voltage applied to slicer SL goes through a narrow voltage interval on one or the other side of the value E volts, the slicer circuit is triggered, which provides the front or the back porch of a rectangular pulse $I'_2$.

Figure 3–*d* represents the arrangement of two decoders of the Shannon-Rack type: DCA (associated with electronic gates $G_2$, $G_4$ and sampling and holding device SHA'), and DCB (associated with electronic gates $G_3$, $G_5$ and sampling and holding device SHB'); these decoders transform the coded pulses $I'_2$ (at the output of slicer SL, Figure 3*i*) into the corresponding odd and even code signals *sc, sc', sc'', sc'''* . . . which are therefore restored.

Each time a coded pulse $I'_2$ goes through gate $G_2$, and reaches decoder DCA (fed by a constant current source SCC) an element of electric charge is brought to capacitor $C_1$; the time constant of Shannon circuit ($R_1$, $C_1$) is such that, between two successive pulses $I'_2$, the charge of capacitor $C_1$ decreases precisely to 50% of its value; therefore the resultant charge (after the arrival of a complete group of pulses $I'_2$ corresponding to an odd code signal *sc*) is the sum of the successive contributions of the pulses of said group, each weighted in a binary manner in accordance with its time of arrival; the weight is 1 for the first pulse $I'_2$ of the group, 2 for the second, 4 for the third, 8 for the fourth, 16 for the fifth, and 32 for the sixth. [In order to discriminate 53 quantized amplitudes of the code signals *sc, sc'* . . . corresponding to the different 53 characters (letters, numbers, or signs) in the basic telegraph code, it is necessary to have six coded pulses $I'_2$ in each received group of pulses applied to decoder DCA, as $2^6=64$ whereas $2^5=32$ only.]

The discharge curve of capacitor $C_1$ (if Shannon circuit $R_1$, $C_1$ was used alone) would decrease very rapidly, and it would be difficult to take (across said capacitor) precisely the desired voltage *sc* at the instant where gate $G_4$ opens the way towards cathode ray tube CRT for the code signal *sc* (see Figure 3*i*). For that reason, the second capacitor $C_2$ (associated with resistor $R_2$ and inductance L) has been introduced by Rack; the resonant circuit $R_2$, $C_2$, L is tuned to the frequency of coded pulses $I'_2$ and has a time constant ($R_2$, $C_2$) of such a value, that the oscillation of said resonant circuit is reduced exactly to one half at each period; Shannon circuit $R_1$, $C_1$ and Rack circuit $R_2$, $C_2$, L combine to give a discharge curve presenting an horizontal portion at each period, and it is therefore much easier to take at point *a* sample of the voltage across ($C_1$, $C_2$) (amplified by a cathode follower $\gamma A$) by means of the sampling and holding device SHA' at the moment when electronic gate $G_4$ is going to open (Figure 3–*d*). Decoder DCB acts for the even code signals in the same manner that decoder DCA acts for the odd code signals.

In order to secure an accurate timing of the encoding operations at the telegraph transmitter and a perfect synchronization (both in frequency and phase) of the decoding operations at the telegraph receiver, use is made of timing circuits TC and TC', represented respectively on Figures 4 and 4–*c*.

Figure 4–*a* shows the oscillograms of the various control waves generated by TC; Figure 4–*b* illustrates the performance of the frequency recovering device FRD feeding TC', and Figure 4–*d* shows the oscillograms of the various control waves generated by TC'.

The timing circuit TC at the telegraph transmitter is energized by a stable oscillator O (Figure 4) generating the sine wave represented on the first line of Figure 4–*a* and having the frequency foreseen for the coded pulses I; said frequency is previously adjusted, taking into account the width of the band of frequencies effectively transmitted by the telephone line $A_1$, $A_2$ at disposal (Figure 3).

The amplitude limiter LM on Figure 4 gives the square top pulses (of same frequency) shown on the second line of Figure 4–*a*. The differentiating (in the mathematical sense) and rectifying device "DR1" of Figure 4 forms narrow "pips" of voltages, alternatively positive and negative (line 3 of Figure 4–*a*), at the steep sides of the square pulses (differentiating action), and eliminates all the positive "pips" (rectifying action), so that the output of DR1 appears on the fourth line of Figure 4–*a*. These negative pips are passed to the "7 to 1 multivibrator" (MV7/1) of Figure 4, which gives at its output an unsymmetrical square-top wave (one half cycle is 3 pulse periods long, and the other 4 pulse periods long); said wave is shown on the fifth line of Figure 4–*a*.

The output of multivibrator MV7/1 is passed through a second differentiating and rectifying device DR2 that gives the sequence of negative "pips" shown on the sixth line of Figure 4–*a*. These pips are used to control a "2 to 1 multivibrator" (MV2/1) which has two outputs giving two waves identical, but of opposite phases, shown respectively on the seventh and twelfth lines of Figure 4–*a*; each controls one of the two coders (CDA and CDB on Figure 3), since the actions with each coder are the same, except for the displacement in time. The first output of "MV2/1" is passed through another differentiator-rectifier DR3 for obtaining the sequence of negative pips shown on the eighth line of Figure 4–*a*. These pips trigger two single-trip multivibrators $MVS_1$ and $MVl_1$, whose time constants are arranged to give output pulses respectively short (output of multivibrator $MVS_1$ shown on the ninth line of Figure 4–*a*) and long (output of multivibrator $MVl_1$ shown on the tenth line of Figure 4–*a*). The long pulse (line 10, Figure 4–*a*) controls the charging time of a capacitor in a constant current circuit (sweep generator SG1), allowing this capacitor to charge linearly while the pulse is off, and maintaining the voltage across this capacitor at zero, when the pulse is present; this gives the linear sweep voltage shown at the eleventh line of Figure 4–*a*, which is used to sweep the beam across the coding electrode ($E_c$ in encoding tube CDA of Figure 3–*a*).

The sampling and holding circuit SHA (at the entrance of coder CDA (Figure 3)) has an electronic gate at the input and a capacitor at its output. The short pulse (ninth line of Figure 4–*a*) holds open this gate, and then the voltage across the capacitor follows the voltage of the admitted specimen of telegraph signals; therefore when the gate closes, the voltage on the capacitor is equal to the signal at that instant, and remains at that value until the gate opens again; this held voltage is applied to the vertical deflecting plates of the encoding tube ($P_v$ in encoding tube CDA of Figure 3–*a*). At the closing of the gate, the electron beam of the encoding tube is turned on; a brief interval is then allowed to permit the feedback of the encoding tube (link between collector K and amplifier $A_v$ on Figure 3–*a*) to adjust the height of the beam to the proper quantized position, and then the linear sweep voltage (eleventh line of Figure 4–*a*) moves the beam across the encoding electrode, ($E_c$ in encoding tube CDA of Figure 3–*a*), giving the coded pulses group I corresponding to the code signal *sc* sampled at that instant.

The same pulse that opened the gate then turns off the beam, the sweep returns to zero, and the instantaneous sample from the next odd channel is taken and applied to coder CDA.

The second output of multivibrator MV2/1 is passed in the same way through a differentiator-rectifier DR4, the output of which is applied to two single-trip multivibrators whose time constants are respectively short (multivibrator $MVS_2$, fourteenth line of Figure 4–*a*) and long multivibrator $MVL_2$, fifteenth line of Figure 4–*a*); the long pulse controls the sweep generator SG2 producing the sweep voltage for coder CDB (shown on the last line of Figure 4–*a*).

The timing circuit TC′ at the telegraph receiver (Figure 4–*c*) is very similar to the timing circuit TC at the telegraph transmitter, except that, instead of the basic oscillator (O, Figure 4) there is a "frequency recovering device FRD" producing a wave having the same frequency and phase than the coded pulses train generated at the transmitting station.

The incoming pulse train $I'_2$ passes at the receiving station (Figure 3*i*) through a differentiator-rectifier before filtering; so a pulse appreciably narrower than a coded pulse is obtained, whenever a coded pulse $I'_2$ is followed by a blank space; the spectrum of this derived pulse (of duration $\epsilon$) has a large component at the recurrence frequency $1/\delta$ (see Figure 4–*b*). These derived pulses occur at intervals which are integral multiples of the coded pulse duration $\delta$; thus the component (at the recurrence frequency $1/\delta$) of each derived pulse has the same phase, and all the contributions add up. By applying the derived train of pulses to a very narrow band filter centered at the coded-pulses-frequency (quartz crystal filter with 60 cycles/sec. bandwidth and 70 decibels outside the band), the recurrence frequency is easily recovered. The output of this filter passes through a shaping circuit, which gives a sequence of square-top pulses at the pulsing rate of the transmitting station; it drives the timing circuit TC′ at the receiving station; the oscillogram of this sequence is reproduced on line $A_1$ of Figure 4–*d*. This wave ($A_1$, Figure 4–*d*) at the output of FRD is passed through a differentiator-rectifier $dr_1$ (Figure 4–*c*), first producing short pips (alternatively positive and negative) at the steep front and back edges of each rectangular pulse produced by FRD (differentiating action), and afterwards suppressing all positive pips (rectifying action), so that the wave $A_2$ shown at the second line of Figure 4–*d* is obtained. These negative pips are applied to multivibrator $MV_1$ (having a ratio 7 to 1) which gives, at its output, two waves (having a frequency reduced in said ratio 7 to 1) shown on lines "$C_1$ or $E_2$" and "$C_2$ or $E_1$" (Figure 4–*d*). By means of differentiators-rectifiers $dr_2$ and $dr_3$, trains of pips are derived from waves $C_1$ and $C_2$, and these pips trigger multivibrators $MV_2$ and $MV_3$ respectively (having both a ratio 2 to 1); at the outputs of said multivibrators are obtained the waves $D_1$ and $D_2$ (Figure 4–*d*). The wave $C_1$ controls electronic gate $G_2$ (Figure 3*i*); the wave $C_2$ controls electronic gate $G_3$; the wave $D_1$ controls the sampling and holding device SHA′; the wave $D_2$ controls the similar device SHB′; the wave $E_1$ controls electronic gate $G_4$; the wave $E_2$ controls electronic gate $G_5$ (Figure 3*i*), $E_1$ and $E_2$ being identical to $C_2$ and $C_1$ respectively.

In the receiving set of the first embodiment of the invention, use may be made of an electrophotographic printer, or of a xerographic printer (for printing the received telegram on a sheet (of paper) instead of a moving photographic film *f* inside a camera; the corresponding modification of Figure 3*i* is illustrated by Figures 3–*e* and 3–*h*. $A_2$ is the end of the telephone line and RDS (Figure 3–*e*) represents the "receiving decoding set" shown in details on Figure 3*i* (lower part); at the output of RDS are obtained the restored code signals (*sc*, *sc′*) and the positive pulses ($sp_2$, $sp'_2$), the latter corresponding to the preliminary signals (*sp*, *sp′*) as explained above. The cathode beam inside cathode ray tube CRT (having a phosphorescent screen F) is deflected vertically by said code signals *sc*, *sc′* (after amplification through RA), and is deflected horizontally by said positive pulses ($sp_2$, $sp'_2$), through a device BA, 29 (represented in details on Figure 3*i*, and embodying balanced amplifier BA and thyratron 29); these positive pulses (conveniently delayed by delay line DL′) control the intensity of said cathode beam, so that the desired character starts to be illuminated on decoding screen DS (by the light produced by electrons impinging on phosphorescent screen F) only when the corresponding code signal *sc* has well positioned vertically said beam of electrons in front of said desired character.

The positive pulses $sp_2$, $sp'_2$ also synchronize the electric motor *m* driving the special paper sheet *p* of an electrophotographic printer EPP (of the type Electrofax of Radio Corporation of America), shown at the right of the multilenticular objective ($l_1 \ldots l_{53}$, $L_1$, $L_2$) on Figure 3–*e*; the shaft of said motor is mechanically connected (by suitable gearings) to the shaft of the coil *dc* driving said paper sheet *p*, and also to the shaft of a rotating magnet *rm*.

The special paper *p* has a thin flexible coating of special zinc oxide in a resin binder, in which has been incorporated a dye sensitizer (for example rose bengal) which (at an optimum concentration) increases the sensitivity to visible light by extending the spectral response to the visible luminous radiations (5000 to 6000 angströms).

In a continuous processing, paper *p* (moving in the direction of arrow *f*) is first made sensitive to visible light by giving, inside camera CM (in the dark), a blanket negative electrostatic charge on the coating side, by means of an ion flow produced by a corona discharge from a few fine wires *w* connected to an electric direct current source *es* of a few kilovolts (negative).

The decoding screen DS has, this time, columns of black characters (letters, numbers or signs) on a white transparent background, so that, at a given instant, light is projected (through slot *s* of camera CM) on this blanket negative electrostatic charge except along the lines of the pattern built by the images of the received characters. During this exposure to the visible light produced by phosphorescent screen F through decoding screen DS, the electrostatic charges leave the surface of paper *p*, towards the supporting paper base and later towards the ground, in proportion to the amount of incident light; therefore a developable negative electrostatic latent image of the received characters remains on the top surface of the coating of paper *p*.

The rotating magnet *rm*, moving at the surface of tank *t* filled with a mixture made of a carrier (iron powder) and a toner (fine particles of low-melting pigmented resin), picks up this mixture, and carries it on, as a "brush," the fibers of which are along the lines of magnetic force. In this mixture, the iron particles take on negative charges, and the toner particles positive charges, by triboelectric effect. When later the so-called "brush" comes in front of (and quite close to) paper *p* on which remained the latent images of the received characters in form of negative charges, the electrostatic attraction between positive toner particles and the negatively charged latent images being greater than the attraction between toner and iron, the toner is stripped from this "brush" and adheres strongly to the paper, forming then visible "powder images" of the received characters. These "powder images" are finally heated while passing below heated platen *hp;* this heating melts the resin powder on the paper surface, producing a durable image of the received telegram.

Figure 3–*h* represents schematically a xerographic printer XP, which may be used instead of the electrophotographic printer EPP of Figure 3–*e*; it comprises a cylinder *cy* rotating continuously in the direction of arrow $\varphi$, while an ordinary paper sheet (*ps*) moves quite close to it, and below it, in the direction of arrow *f*. Cylinder *cy* has an outer coating of photoconductive material (*pc*) having a very high specific dark resistance, and laid on a cylindrical support having a much lower specific resistance; this photoconductive coating *pc* is for example a thin layer of selenium (or of a specially prepared cadmium sulphide CdS doped substitutionally with manganese and oxygen and interstitially with cadmium ion). This coating *pc* first receives, inside camera CM (in darkness) a blanket negative electrostatic charge produced by the ion flow of a corona discharge of a row of fine wires *w*, raised at a negative potential of a few thousand volts, by a half wave-rectified-unfiltered-electric-power source $es_1$; coating *pc* is thus made sensitive to light. Later the luminous image of one line of the received telegram (produced by the phosphorescent light of screen F of cathode ray tube CRT, through decoding screen DS having black characters on a transparent white background, through multilenticular objective $l_1$, $l_{53}$, $L_1$, $L_2$, and after reflection on a fixed mirror M) falls (through slots *s* of camera CM) on one generatrix of cylinder *cy*. The electrostatic potential of coating *pc* decays rapidly where the light has struck it, but remains substantially as a latent image along the lines of the projected black characters. Later, by means of device $j_1$, a special mixture is thrown on coating *pc* (bearing the latent electrostatic images of said characters), for the purpose of developing said latent images. For negatively charged images, the appropriate mixture is made of a toner (consisting in a powder of pigmented lycopodium particles, 0.1 to 20 microns in size) and of a carrier (sand grains of 300 microns); these two materials being electrified in this mixture by triboelectricity, the very light toner particles adhere only to the electrically charged areas (that is to say the images of the characters), whereas the sand grains (and the rest of the mixture poured by $j_1$) fall into tank $t_1$. In its further rotative motion, cylinder *cy* puts these "powder images" in very close contact with the ordinary paper sheet *ps* which has previously received an electrostatic charge of opposite sign to the charge of the powder, by means of a row of fine wires *r* raised at an appropriate potential by D.C. electric source $es_2$; the powder is attracted from cylinder *cy* to paper sheet *ps* and adheres to the paper.

This micronized low-fusing-temperature powder so transferred to the paper is then heated below a fixed heated platen *hp*, and quickly fuses to form (on paper sheet *ps*) a permanent image of the received telegram. The cylinder *cy* is finally cleaned for re-use, by means of a jet of coarse granular powder (such as sodium chloride), cascading from device $j_2$ over the photoconductive coating *pc* to the tank $t_2$. The whole set up of xerographic printer XP operates in a continuous processing, with a continuous motion of cylinder *cy* and paper sheet *ps*, both driven by an electric motor *m* (not represented on Figure 3–*h*), which is synchronized with the distant telegraph transmitting station (as shown on Figure 3–*e*, for the case of the electrophotographic printer EEP).

Figure 3–*f* illustrates the application of the first embodiment of the invention to "remote measuring," the results of the measurements being luminously displayed (at distance) on a "light amplifying panel" LAP, based on the phenomenon of electroluminescence. This panel LAP comprises, between two transparent metallic surfaces $e_1$, $e_2$ (acting as capacitor electrodes) one photoconductive layer *pcl* (the conductivity of which is controlled by the light falling on it, through a transparent cover glass *cg*), behind which is located an electroluminescent layer *ell* viewed by the observer through a transparent glass *tg*. A source of alternating current ACS (for example producing a voltage of a few hundred volts at a frequency of several hundreds of cycles per second) is connected to electrodes $e_1$, $e_2$ through an electronic gate G′. This structure operates like a series-combination of a non-linear resistor (the photoconductive layer *pcl*, controlled by the incident light) and a capacitor (the electroluminescent layer *ell*), with an A.C. voltage applied across the two; for each bright spot of the incident luminous image falling on layer *pcl*, the resistance of the photo-conductive material drops at that point, and consequently a high voltage is applied at the corresponding point of the electroluminescent layer *ell*; this produces a much brighter spot for the observer looking through the outer transparent glass *tg*. The light produced by the electroluminescent layer can be eventually reinforced if a projector throws at the same time ultra-violet radiations, on the outer part of the electroluminescent layer *ell* (through said transparent glass, which then must be transparent for both ultra-violet radiations and visible light).

In the case of Figure 3–*f*, the incident light comes from the phosphorescent screen F of cathode ray tube CRT through decoding screen DS, multilenticular objective $l_1$, $l_{50}$, $L_1$, $L_2$, cylindrical lens L′, and cylindrical lens L″, after reflection on rotating mirror drum RD, which rotates step-by-step slowly, being driven (through a suitable mechanical device $\gamma$) by an electric motor *m*, the motion being synchronized with the distant transmitting station through contact $\beta$.

The photoconductive material constituting layer *pcl* may be for example cadmium sulphide (CdS), the conductivity of which changes with an inertia of a few seconds when excited by visible light; the electroluminescent material constituting layer *ell* may be for example a zinc sulphide (ZnS) activated by copper (Cu) and lead (Pb), giving (without inertia) a green visible light when submitted to an alternating voltage of 400 to 800 volts with a frequency of 1000 to 4000 cycles per second. The triggering time of the photoconductive effect is of the order of 1 to 3 milliseconds, but the luminous display produced by the electroluminescent layer may continue during a time much longer than the inertia of the photoconductive material, by using a light diffusing arrangement in order to sustain the photoconductive effect by means of part of the electroluminescent light radiated backwards on said photoconductive material; such an arrangement acords the possibility to keep a long time a bright luminous pattern on the electroluminescent layer *ell* (once triggered in 1 to 3 milliseconds), until the connections are cut off between the alternating current source ACS and the electrodes $e_1$, $e_2$ of the light amplifying panel LAP, by means of electronic gate G′.

This arrangement is for example used by Sylvania Electric Products Incorporated, as represented on Figure 3–*g*. Each element of the panel comprises: (1) a glass column *k* (with a conductive film cap *d* fused to the electroluminescent layer *ell* and a conductive film cap *g*, cemented to the conductive film coating $e_2$ of cover glass *cg*), and (2) a sintered piece of photoconductive material *pc* placed between two successive glass columns *k*, *k′*. An attenuating layer (represented by small dashes) covers the remaining surface of the electroluminescent layer between two caps *d*, *d′*.

Light passing (through cover glass *cg* and transparent conductive films $e_2$ and *g*) into a glass column *k*, strikes, by dispersion, the adjacent photoconductor *pc* on the wall of the glass column; in the presence of this light the resistance of the photoconductor decreases rapidly and becomes a very low resistance between conductive end caps *g* and *d*; the electroluminescent layer *ell* (at the corresponding point) has therefore a major part of the alternating voltage applied between $e_1$ and $e_2$, and consequently visible light is emitted there; this emitted light travels in both directions; passing out through the transparent glass *tg*, it will become one point of a bright display, and passing up into the glass column it will be sufficient to keep the photoconductor *pc* in a conducting state. The original triggering light being removed, the element will continue to emit light until the display is willingly erased by breaking the connections between source ACS and electrodes $e_1$, $e_2$. The ambient light being below one foot lambert, the applied A.C. voltage being about 400 volts at 3500 c./s., it is possible to obtain a luminous display with a brightness of 10 foot lamberts, lasting a long time whereas the triggering time is only of 1 to 3 milliseconds.

Referring now to Figure 3–*f*, $M_1$, $M_2$, $M_3$ . . . $M_{29}$, $M_{30}$ represent 30 different electrical measuring instruments, being understood that if the quantity to be measured is a displacement of a mechanical moving piece, this piece can be mechanically connected to the moving magnetic core of a differential transformer which delivers, at its output, an electrical voltage proportional to said displacement.

Practically, measuring instruments used permanently for routine measurements give the difference between the actually measured quantity and the corresponding nominal value specified for this quantity in normal operating conditions. If an accuracy between 1/100 and 1/1000 is wanted, this difference is expressed by a number made of 3 ciphers. Let us assume that for instrument $M_1$, the nominal value is 125 and the practical range of variation goes from 100 to 150 (in 50 steps); then on decoding screen DS, the first column at the left will have (transparent on an opaque back ground) the 50 successive numbers: 101, 102 . . . 148, 149, 150. Similarly, if for instrument $M_{30}$, the nominal value is 935 and the practical range of variation goes from 911 to 960, the last column at the right of decoding screen DS will have the 50 successive numbers: 911, 912 . . . 959, 960. The first piece of the multilenticular objective ($l_1$ . . . $l_{50}$, $L_1$, $L_2$) will be made of 50 lens elements corresponding to the 50 horizontal lines of screen DS, each of these horizontal lines being made of 30 numbers (of 3 ciphers) corresponding to successive readings of the 30 measuring instruments $M_1$ . . . $M_{30}$.

SM (Figure 3–*f*) is a electromechanical switch (or a beam switching tube) having 30 consecutive contacts, separated by a small interval between any two of them, and followed by a "stop" contact *s*; the motion of the "rotating arm" of switch SM is controlled by a relaxator RL synchronized by local oscillator O (of a higher frequency). The thirty contacts are connected to the electrical output terminals of the 30 measuring instruments respectively. It is assumed that the "rotating arm" of SM makes one turn during one second, remains on the stop contact *s* during the nine following seconds, and repeats again and again the same cycle; therefore a "sampled reading" of each instrument is taken one time every 10 seconds, and the "rotating arm" of switch SM conveys to the input of the "transmitting coding set" TCS an electric wave similar to the one shown on line *b* of Figure 2 and obtained also at the output of amplifier 22 of Figure 3. This electric wave is made of a sequence of "code signals" *sc*, *sc'* . . . having the same duration T (separated from each other by a short period *t*) and having different amplitudes, the range of which is assumed to be quantized in 50 steps. The transmitting coding set TCS (comprising two beam coders CDA, CDB as shown on Figure 3–*a*) produces (through differentiating tube $l_2$ and shaping filter $SF_2$) groups of alternating coded pulses $I_1$ of relatively small amplitude, corresponding to said "code signals" *sc*, *sc'* . . ., and applied to electronic mixer MX.

The local oscillator O feeds a timing circuit TC for accurately timing the encoding operations of TCS, the lay-out and the performance of said timing circuit TC being illustrated by Figures 4 and 4–*a*. On the sixth line of Figure 4–*a* is shown a sequence of negative "pips" generated by TC, which trigger an electronic gate G (fed by the wave of square pulses obtained at the output of limiter LM, inside timing circuit TC, and shown on the second line of Figure 4–*a*); at the output of gate G is therefore obtained a series of rectangular pulses having the same shape and frequency as those obtained at the output of amplifier 20 on Figure 3. As explained above, this sequence of rectangular pulses is transformed (by differentiating tube $l_1$ and shaping filter $SF_1$) into a sequence of alternating pulses ($sp_1$, $sp'_1$ . . .), corresponding to the preliminary signals *sp*, *sp'* shown on line (*c*) of Figure 2, and having a larger amplitude than alternating coded pulses $I_1$. These alternating pulses *spl*, $sp'_1$ . . . are applied, through delay line DL, to electronic mixer MX.

All these alternating pulses ($I_1$, $sp_1$) are sent, through the telephone line $A_1$, $A_2$, to the distant receiving station, where a "receiving decoding set" RDS (represented in details at the bottom of Figure 3) produces: in a first branch, a sequence of positive pulses $sp_2$, $sp'_2$ . . . corresponding to alternating pulses $sp_1$, $sp'_1$—and, in a second branch (through decoders of the Shannon-Rack type DCA, DCB), the restored "code signals" *sc*, *sc'* . . . .

CRT (Figure 3–*f*) is a cathode ray tube having a rectilinear horizontal cathode K, a wenhelt cylinder W, two vertically deflecting plates V energized by said code signals *sc*, *sc'* (through amplifier RA), two horizontally deflecting plates H energized by said positive pulses $sp_2$, $sp'_2$ . . . through a device BA, 29 (shown in details at the bottom of Figure 3) comprising a balanced amplifier BA and a thyratron 29, and finally a phosphorescent screen F. The positive pulses $sp_2$, $sp'_2$ . . . (conveniently delayed by delay line DL') control the intensity of the cathode beam in tube CRT, so that the desired group of 3 ciphers starts to be illuminated on decoding screen DS (by the light produced by electrons impinging on phosphorescent screen F) only when the corresponding code signal *sc* has well positioned vertically said beam of electrons in front of said desired group of 3 ciphers.

These positive pulses $sp_2$, $sp'_2$ . . . (by means of ring $\beta$ on the shaft of motor *m*) synchronize the motion of said motor in such a way that the rotating mirror drum RD (set in a step-by-step motion) projects successively the lines of luminous numbers of screen DS on the successive lines of the photoconductive layer *pcl* of light amplifying panel LAP.

The length of the rectilinear horizontal cathode K of tube CRT is such that the electronic image of said cathode K on phosphorescent screen F covers exactly the space corresponding to one group of 3 ciphers on one horizontal line of screen DS (for example the number 148 on the 48th line of the first column at the left of DS). To the 30 readings taken successively during one second on the 30 measuring instruments ($M_1$ . . . $M_{30}$) at the transmitting station, correspond $7\times30=210$ alternating pulses ($sp_1$, $I_1$) transmitted (every 10 seconds) on line $A_1$, $A_2$ (Figure 3–*f*) during one second, and it will be proved later in this specification (in connection with Figure 5–*g*) that this is quite possible on a modern telephone line. The light emitted by phosphorescent screen F of tube CRT (where electrons from cathode K have impinged) passes through the optical system shown at the bottom of Figure 3–*f* and is integrated by photoconductive layer *pcl* of panel LAP during the phosphorescence of the material constituting screen F, that is to say during a longer time than the triggering time (1 to 3 milliseconds) quoted above. Once triggered, the luminous display is maintained during a few seconds until it is willingly erased by the action of one pulse (such as $sp_2$) acting on electronic gate G' which controls the connection between source ACS and electrodes $e_1$, $e_2$ of panel LAP. [Eventually the same pulse, acting on another electronic gate controlling the connection between an electric source and a projector of ultra-violet radiations, ceases the throw of said radiations on the transparent glass *tg* of panel LAP.] The pulse acting periodically on gate G′ is produced by a well known electronic pulse counter PC. It is naturally possible to handle simultaneously a much greater number of measurements, while giving more time to each observer for studying the data related to one particular measuring instrument; for achieving this result, a distributor switches periodically (to the input) of the transmitting coding set TCS (Figure 3–*f*) the "rotating arm" of each of several switches such as SM (corresponding each to a group of 30 measuring instruments); to each switch SM of the transmitting station correspond, at the receiving station, a particular cathode ray tube CRT and a particular light amplifying panel such as LAP (Figure 3–*f*); a distributor, at the receiving station, distributes (on a time division basis) the received alternating pulses ($sp_1$, $I_1$) to these various cathode ray tubes successively. If 10 switches such as SM are used at the transmitting station, and 10 panels such as LAP are used at the receiving station, it is possible, with one telephone line, to observe at distance $10\times30=300$ measuring instruments, an observer having ample time for observing one particular set of 50 measurements corresponding to a particular distant measuring instrument.

Many other applications of the high speed telegraphic system represented on Figure 3–*f* may be envisaged, such as remote air traffic control, remote computer readout, remote advertising, etc.

Figures 5–*a* and 5–*b* represent the second embodiment of the invention; the transmitted station shown on top of Figure 5–*a* is very simplified as compared with the transmitting station shown on Figure 3; the encoding arrangement comprising 2 coders (CDA and CDB on Figure 3) is no more necessary; the holes produced on a paper tape *b* (by a perforator associated with a keyboard) are such that the alternating pulses $sp_1$ (corresponding to the preliminary signal *sp*) and $I_1$ (corresponding to the code signal *sc*, described here above) are directly generated when the optical device (*s, l, mt*), represented on Figure 5–*a* scans said paper tape *b*, while electric motor *mo* rotates.

When the operator at the transmitting telegraph station depresses a key (on her keyboard mechanically connected to a perforator), she produces (on a paper tape *b*, as represented on Figure 5–*a*) two holes (above each other and side by side) having shapes and relative positions similar to those of the positive and negative half waves of a cycle of an electric alternating sinusoidal wave; these two holes correspond to the preliminary signal *sp* allotted to the character (letter, number or sign) related to said depressed key on said keyboard; aligned with these two holes (along the same transversal line of paper tape *b*) are produced, at the same time (by the action of the code bars located under the keys of the keyboard and controlling, at their respective ends, the motion of perforating needles) some couples of holes of same shapes corresponding (in binary pulse code modulation) to the quantized amplitude of the code signal *sc* allotted to said character.

When all the characters of the telegrams have so been recorded (by means of such holes) on the paper tape, the operator calls by telephone the distant station advises that telegrams are going to be transmitted, and then connects the output of mixer MX (Figure 5–*a*) to the origin $A_1$ of the telephone line $A_1$, $A_2$; the electric motor *mo* is set then in motion, and drives paper tape *b* (by means of gearing *e*) in a continuous displacement, with a constant speed *v* corresponding to the width of the band of frequencies effectively transmitted by line $A_1$, $A_2$.

On the shaft of electric motor *mo* is mechanically connected a rotating mirror *mt*; a luminous image *s′* of a rectilinear luminous source *s* (for example an incandescent rectilinear filament electrically heated) is formed (by cylindrical lens *l*, after reflection on rotating mirror *mt*) on paper tape *b*, and, when electric motor *mo* rotates, said image *s′* of *s* scans the perforations of paper tape *b*. The luminous ray beams collected by phototransistors (or small photoelectric cells) *ph, ph′* generate the two half waves of an alternating pulse $sp_1$ of great amplitude corresponding to the preliminary signal *sp*; the luminous ray beams successively collected by the long horizontal photoelectric cells *cp, cp′* (when *s′* scans optically the rest of the same transversal line of paper band *b*) generate a group of alternating pulses $I_1$ (of smaller amplitude) corresponding to the quantized amplitude of the "code signal" *sc*.

As shown on Figure 5–*f*, the perforations corresponding to the preliminary signals (*sp, sp′, sp″* . . . Figure 2) and moving in front of photatransistors *ph, ph′* have the same height and width than those corresponding to the coded pulses (*sc, sc′, sc″* . . . Figure 2) and moving in front of photocells *cp, cp′*; but the amplifiers 21 and 21′ (at the output of phototransistors *ph, ph′*) are given a substantially higher gain than the amplifiers 22, 22′ (at the output of photoelectric cells *cp, cp′*).

All these alternating pulses (generated by *ph, ph′, cp, cp′* when luminous image *s′* scans paper band *b* in the direction of arrow $\varphi$ are (through electronic mixer MX, Figure 5–*a*) sent over the telephone line $A_1$, $A_2$; at the receiving station these pulses are recorded by coil $B_1$ on a magnetic ribbon RM, set in continuous motion (at the request of the transmitting station) with a constant high speed *v′* corresponding to the width of the band of frequencies effectively transmitted by line $A_1$ $A_2$.

If all these alternating pulses ($sp_1$, $I_1$) had, at the output of mixer MX, exactly the shape of one period of a regular sine wave in steady state (represented by curve 0 of Figure 5–*g*) they would have, at the end of line $A_1$, $A_2$ (due to the "envelope delay distortion" of said line) the shape of curve 3 of Figure 5–*g*; it is here assumed that the telephone line acts as a low-pass-filter having (in steady state) an attenuation of 10 decibels for the regular sine wave (of frequency 3400 c./s. represented by curve 0) whereas the attenuation of the mean frequency (1000 c./s.) is negligible; curve 3 of Figure 5–*g* is the difference between curve 1 (which coincides with curve 3 in the first positive part and then is represented by a thin solid curve) representing the received complete regular sine wave (curve 0) if suddenly applied (at the origin of line $A_1$, $A_2$) at instant zero on one side, and curve 2 (line of dashes) representing the received complete regular sine wave if suddenly applied (at the origin of the line) one period later, and in opposite phase, on the other side. It is apparent that the distorted received alternating pulse (curve 3) would have a duration double that the applied pulse (if said applied pulse had the shape of one period of a regular sine wave), taking into account the fact that the slicer SL (Figure 3–*b*) would operate at a level corresponding to ⅔ of the steady state amplitude. Consequently, if the line $A_1$, $A_2$ had no "envelope delay distortion" and transmitted effectively the frequency 3400 c./s. in steady state, the maximum number of such alternating pulses which could be discriminated from each other at the end of said line would be 3400; because of the existing "envelope delay distortion," this number would be 3400/2, assuming that each pulse is one period of a regular sine wave of frequency 3400 c./s.; as seven such alternating pulses correspond to one transmitted character (one pulse for the preliminary signal and six for the code signal), the efficiency of the telegraph transmission would be $$\frac{3400}{2\times7}=242$$

characters per second,

This efficiency can be substantially increased if, instead of giving to an alternating pulse exactly the shape of one period of a regular sine wave having a steep front porch and also a steep back porch, use is made of an alternating pulse of more gradual shape at the beginning of the first (positive) half wave and also at the end of the following (negative) half wave, as represented by the curve "amplitude *a*-time *t*" at the right of Figure 5–*h*; in other words, one part of the distortion that the telephone line would give to a signal constituted by one period of a regular sine wave is thus given as "predistortion" to each alternating pulse before applying it at the origin of said line; in order to achieve this result, the perforations of paper band *b* (Figure 5–*a* or Figure 5–*f*) should have the shape represented by the hatched surfaces at the middle of Figure 5–*h*, whereas the vertical line *s'* (at the left of said Figure 5–*h*) is the luminous image of the source *s* of Figure 5–*a*.

Figure 5–*f* shows on each transversal line of paper band *b* (called *q*, *q* + 1, *q* + 2 . . . ) a first couple of holes on the longitudinal line (called 1) and possibly a maximum of six other couples of holes on the six other longitudinal lines (called 2, 3 . . . 7), because it is assumed that there is a total of 53 different characters which may be transmitted (see Figure 5–*c*), and because $2^5=32$, whereas $2^6=64$. If the total number of different characters is less than 32—or if, like in the usual international teleprinter code, special signals are used to announce "letters" or "numbers" respectively, it is sufficient to have (on paper band *b*) only 6 longitudinal lines corresponding: the first to the preliminary signal *sp*, and the five others to the code signal *sc*.

This assumption is made for the appended Figure 5–*b* representing the receiving telegraph station of the second embodiment of the present invention, where an ordinary teleprinter (start-stop apparatus) is used for printing the received telegram.

After disconnection of the telephone line $A_1$, $A_2$ (Figure 5–*a*), the magnetic ribbon RM (on which the alternating pulse $sp_1$ corresponding to the preliminary signal *sp*, and the pulses $I_1$ corresponding to the code signal *sc* have been recorded) is put in a continuous motion under reproducing coil $B_2$, at a constant low speed $v'_1$, corresponding to the printing capacity of the receiver of a start-stop teleprinter, energized by its line relay RL', through the code-converting cathode ray tube O*c* (represented on Figure 5–*b* and described hereafter).

Reproducing coil $B_2$ feeds two channels (like in the case of Figure 3). The first channel, comprising separating tube ST, shaping filter $SF_3$ and delay line DL', produces the signals $sp_2$, $sp'_2$ . . . (spaced T apart, in time, and of opposite phase compared to preliminary signals *sp*, *sp'* . . . Figure 5–*e*). The second channel, comprising electronic gate $G_1$, rectifier R, slicer SL, decoding devices ($G_2$—DCA—SHA'—$G_4$) and ($G_3$—DCB—SHB'—$G_5$) and receiving amplifier RA, restores the code signals *sc*, *sc'* (Figure 2) as explained above in connection with Figure 3.

The positive rectangular pulses $sp_2$, $sp'_2$ . . . are applied to the cathode and control grid of thyratron T*h* (triode with gaseous atmosphere), the anode of which is maintained at a high potential by means of a local battery. Each of these positive pulses $sp_2$, $sp'_2$ . . . reduces the ionization potential of the thyratron T*h*, as shown, by the dotted line on Figure 5–*e*. The bias of the grid of thyratron T*h* is adjusted in such a manner that thyratron T*h* becomes conducting when the anode potential reaches the value $E_2$; then electric charge accumulated on the armatures of capacitor C (Figure 5–*b*) flows rapidly away through thyratron T*h*, and the voltage *t*C across capacitor C decreases rapidly to a value $E_1$ for which the ionization does not exist any more in thyratron T*h*, which then is no more conducting. Afterwards, capacitor C charges itself slowly again, and the same cycle begins again, as shown on Figure 5–*e*.

The saw-tooth wave *t*C (voltage across capacitor C) has therefore a linearly increasing part during the interval of time T (duration of a code signal *sc*); this saw-tooth wave *t*C (Figure 5–*e*) is applied to plates *v*, *v'* for vertical deflection of the cathode ray beam of cathode ray tube O*c*, while code signal *sc* is applied to plates *h*, *h'* for horizontal deflection of said beam. Therefore, during the time T when code signal *sc* keeps a constant amplitude, the electronic image of cathode *k* (through positive anode *a*) moves vertically from bottom to top of a particular vertical rectangle of band B of electrode E, which corresponds percisely to said code signal *sc*, that is to say to a particular character of the telegram recorded on magnetic ribbon RM.

A portion of said band B [of electrode E of cathode ray tube O*c* (Figure 5–*b*)] is represented on Figure 5–*d*. As the international teleprinter telegraphic code involves 31 different combinations of five pulses, band B of electrode E of tube O*c* comprises 31 vertical rectangles each made of 5 little squares, a hatched square representing a solid part of electrode E and also a blank (no signal) in the converted telegraphic code for the printer controlled by cathode ray tube O*c*, whereas a non hatched square represents a hole in electrode E or a positive telegraphic signal collected by final plate C of tube O*c* and conveyed to the receiving relay RL' of a teleprinter receiver. The cathode ray tube O*c* (Figure 5–*b*) converts, as explained hereafter, the telegraphic signals *sp* and *sc* (of the rythmic code represented on the appended Figure 2) into those of the usual non rythmic telegraph code used in conventional teleprinters.

A restored code signal *sc* (at the output of amplifier RA), acting on deflecting plates *h*, *h'*, positions the cathode ray beam exactly below the desired vertical rectangle which (on band B of electrode E) corresponds to the character to which said signal *sc* has been alloted in accordance with the rythmic code shown on Figure 2; the sawtooth voltage *t*C (Figure 5–*e*), acting on deflecting plates *v*, *v'* (Figure 5–*b*), moves vertically the cathode ray beam along said desired vertical rectangle; this scanning vertical motion generates the set of 5 pulses corresponding to said character (in the usual non rythmic telegraphic code) because electrons (passing through the holes of said band B) are collected by electrode C of cathode ray tube O*c*, and are returned to cathode *k* through resistor *r*. These pulses energize the relay RL' of the receiver of a conventional teleprinter (not shown on Figure 5–*b*), whereby said character (corresponding to code signal *sc*) is printed on a paper sheet. The received telegram is so printed on said sheet at the maximum speed of operation of a teleprinter receiver.

Figure 5–*i* should be read in association with Figure 5–*a* and Figure 5–*f*, and represents the receiving station of the second embodiment of the present invention in the case where, for printing the received telegrams at said receiving station, use is made of an electrographic printer operating at great speed, the total number of characters to be transmitted being 53 (as shown in Figure 5–*c*).

In this case, the magnetic ribbon RM shown on Figure 5–*a* is no more necessary, and the output $A_2$ of the telephone line [fed by mixer MX (Figure 5–*a*) at the origin $A_1$] is directly connected to the two branch receiving circuit [comprising, like on Figure 5–*b*, the separating tube ST, the shaping filter $SF_3$, the electronic gate $G_1$, the rectifier R, the slicer SL, the decoding device ($G_2$—DCA—SHA'—$G_4$—$G_3$—DCB—SHB'—$G_5$), the frequency recovering device FRD and the timing circuit TC']. At the end of the first branch of said receiving circuit the restored code signals *sc*, *sc'* . . . are (after amplification by receiving amplifier RA) applied to the horizontally deflecting plates *h*, *h'* of the "telegraphic code converting cathode ray tube" O*c*. At the end of the second branch of said receiving circuit, the positive pulses $sp_2$, $sp'_2$ . . . (corresponding to the preliminary signals *sp*, *sp'*

. . . , see Figure 5–*j*) pass through delay line DL′. These positive pulses (conveniently delayed) are applied: (1) to the cathode and grid of thyratron T*h* controlling the vertical deflection of the cathode ray beam in tube O*c* by means of deflecting plates *v*, *v*′, (2) to the synchronizing brushes *b*, *b*′ of electric motor M*o* (fed by source SE) driving the special paper sheet PS which moves in front of the seven electrodes ($e_1$ . . . $e_7$) of said electrographic printer, (3) to a differentiating-rectifying device *dr*, the output of which is connected to the cathode *k* and the Wehnelt cylinder *w* of tube O*c*.

In this case, the printing of a character is obtained by selecting some of the 35 dots of a matrix made of 5 lines comprising 7 dots each; for the reproduction of one character, the seven electrodes $e_1$ . . . $e_7$ (Figure 5–*i*) must receive successively 5 trains of short electric pulses, each train comprising from one to seven simultaneous pulses.

For example, if the flow of time is represented by arrow $\phi$ on Figure 5–*k*, for letter I (shown after a rotation of 180 degrees), the first and fifth trains of pulses do not exist, the second and fourth trains comprise two simultaneous pulses (represented by little dashes) at both ends of said trains, and the third train comprises seven simultaneous pulses. In the case of letter H (also shown after a rotation of 180 degrees), the first and the fifth trains comprise seven simultaneous pulses, and the second, third and fourth trains comprise only one pulse.

When an electrode ($e_1$ . . . $e_7$) receives such a short electric pulse, an electric charge is dropped by said electrode on a special paper sheet PS; later a special powdered ink thrown on said sheet adheres to the point where this charge has been deposited, and, when afterwards the paper PS moves close to a heated platen and is so conveniently heated, a fixed and permanent dark spot is there produced; the desired character is constituted by a group of such dark points.

The cathode ray tube O*c* (Figure 5–*i*) operates with a flat cathode ray beam produced by a horizontal rectilinear cathode *k*, the rest of the electron optics (Wehnelt cylinder *w*, accelerating anode *a*, deflecting plates *v*, *v*′ and *h*, *h*′) being of the cylindrical type. The distance between plates *h* and *h*′ (for horizontal deflection of said beam) is rather large in order to cope for the length of the rectilinear cathode, which involves more power delivered by receiving amplifier RA for said horizontal deflection. The band B of electrode E (shown on Figure 5–*k*) is made of linear perforations in front of which are located thin vertical metallic wires constituting a collecting array C enclosed between two bars represented by transversal dotted lines and made of an electrically insulating plastic material. This collecting array C is located quite close to band B of electrode E in order that its wires collect well the electrons passing through the small vertical slots of electrode E (shown by small dashes on Figure 5–*k*). Every seventh wire of this array C is connected to one of the output terminals ($b_1$, $b_2$, $b_3$, $b_4$, $b_5$, $b_6$, $b_7$) of cathode ray tube O*c* (see also Figure 5–*i*).

As shown on Figure 5–*j*, the device *dr* (by its differentiating action) derives from each pulse $sp_2$ one positive "pip" followed by a negative "pip" (see the 6th line of Figure 5–*j*); by the rectifying action of device *dr*, only the positive pips $sp_3$, $sp'_3$ . . . remain at the output of said device *dr* (see the last line of Figure 5–*j*). The thyratron T*h* (Figure 5–*i*), as explained above, generates the saw-tooth wave *t*C (Figure 5–*j*). Each positive pip such as $sp_3$ occurs during the rapidly falling part of said saw-tooth wave, which (as explained above) serves to scan vertically (up and down) band B of electrode E by the electronic image *k*′ of cathode *k* of tube O*c*. These "pips" (such as $sp_3$) are applied to cathode *k* and Wehnelt cylinder *w* of tube O*c* in such a manner that the beam is cut off during each falling part of the saw-tooth wave *t*C (Figure 5–*j*); therefore it is only during the middle of the slowly rising part of wave *t*C that the electrons of image *k*′, moving in the direction of arrow $\varphi$ (see Figure 5–*k*), are collected by the metallic wires of collecting array C, and then conveyed (as short electric pulses) to the seven electrodes ($e_1$ . . . $e_7$) of the electrographic printer. These electrodes are aligned along a transversal line of paper sheet PS; and (under the control of the positive pulses $sp_2$, $sp'_2$ . . . corresponding to the preliminary signals *sp*, *sp*′ . . .) electric motor M*o* moves the paper sheet PS along the length alloted to one character of the received telegram. Looking simultaneously to Figure 5–*k* and to the top of Figure 5–*i*, it is apparent that letters (I and H) reversed on Figure 5–*k* are normally printed on paper sheet PS of Figure 5–*i*. As shown on Figure 5–*k*, it is convenient to leave a small space between two successive groups of seven thin vertical metallic wires of collecting array C, in order to cope for a certain error in the horizontal deflection of electronic image *k*′ of cathode *k* under the action of a code signal *sc*. In order to avoid the necessity of a too large tube O*c*, use can be made (as explained in U.S. Patent No. 2,620,394 and represented on Figure 10 of said patent) of a cathode ray tube O*c* having two flat cathode beams produced by two horizontal rectilinear cathodes $k_1$, $k_2$, the bulb of said tube being separated in two parts by a metal plate, preventing any influence from one beam on the other. In each part of the bulb is a cylindrical electron optics similar to the one shown on Figure 5–*i*. The metal plate (separating the bulb in two parts) terminates close to electrode E, which comprises in its upper part a perforated band $B_1$ corresponding to 27 letters, and in its lower part another perforated band $B_2$ corresponding to 27 numbers or signs, band $B_1$ being scanned by electronic image $k'_1$ of cathode $k_1$ when a letter is transmitted (the beam of cathode $k_2$ being then cut off), and band $B_2$ being scanned by electronic image $k'_2$ of cathode $k_2$ (the beam of cathode $k_1$ being then cut off). The collecting array of thin metallic wires C (Figure 5–*i* and 5–*k*) is common to the two cathode beams. Use is made of two signals of different frequencies (a "letter discriminating signal" and another signal discriminating the characters other than letters).

In such a case, the connection between the telephone line and the receiving station (point $A_2$ on Figure 5–*i*) includes a device comprising a limiter followed by two band pass filters in parallel (device LMF represented in dotted lines at the bottom of Figure 5–*i*); the limiter reduces the amplitude of the received alternating pulse $sp_1$ to the amplitude of the following received coded pulses $I_1$; the band pass filters which follow are tuned to the frequencies of said discriminating signals, respectively; the train of pulses passing through one of these filters (if this train is sufficiently long and simulates a regular sine wave) energizes a "current inverting unit" acting on one Wehnelt cylinder of tube O*c* ($w_1$ or $w_2$) in order to cut off the undesired cathode beam, as explained in U.S. Patent No. 2,620,394.

In this case the perforated paper band *b* at the transmitting station has only six longitudinal lines (numbered 1, 2, 3, 4, 5, 6 on Figure 5–*f*), line 1 being used for the first alternating pulse $sp_1$ of great amplitude while lines 2 to 6 are used for the group of alternating coded pulses $I_1$ of smaller amplitude, following $sp_1$. The number of combinations available with 5 coded pulses being $2^5=32$ whereas only 27 letters exist (and also 27 numbers or signs exist), it is possible to reserve the combination of six consecutive perforations of band *b* (Figure 5–*f*) for the "letter discriminating signal," and the combination of only three perforations (on longitudinal lines 1, 3 and 5) for the other discriminating signal. When punching said paper band *b* at the transmitting station, the operator impresses 5 times successively (on 5 successive transversal lines, numbered *q* to ($q+4$) on Figure 5–*f*) one or the other of these combinations of holes on said paper band; when, later, said band moves at great speed in front of phototransistors *ph*, *ph*′ and photocells *cp*, *cp*′ (Figure 5–*a*), a regular train of pulses of the desired frequency is obtained at the output of device LMF (Figure 5–*i*), and it operates the above mentioned "current inverting unit" (through the appropriate band pass filter within device LMF).

Having so described two embodiments of my invention, I wish it to be known that I do not desire to be limited to the exact details of construction shown and described, for obvious modifications will occur to persons skilled in the art.

What I claim as new and desire to secure by Letters Patent of United States of America is:

1. High speed system for telegraphy or for remote measuring over a telephone channel, comprising at the transmitting station: an encoding device generating without inertia, for each element of information to be transmitted, a preliminary alternating pulse of great amplitude and of small duration, followed by a combination of alternating coded pulses of smaller amplitude and of longer total duration, said combination characterizing said element of information, said pulses having a distorted shape (as compared with a regular sinusoid) with gradual increase at the beginning of the positive half wave and also at the end of the negative half wave, and an idle interval (without any pulses) separating two sequences of elements of information, a local oscillator, a timing device fed by said local oscillator for accurately timing the encoding operations, a delay line bringing said coded pulses immediately after said preliminary alternating pulse, an electronic mixer energized by the groups of pulses and feeding the telephone channel towards the distant receiving station; and at the receiving station: an electronic amplitude filter separating the received preliminary alternating pulse of greater amplitude, an electronic gate controlled by said separated pulse for separating the following combination of coded pulses, a rectifier suppressing the negative parts of said pulses, an electronic slicer acting on the positive parts of said pulser, a pulse code demodulating device transforming each combination of said sliced pulses into an analog signal corresponding to a particular received element of information, a frequency recovering device energized by the train of received coded pulses, a timing device controlled by said frequency recovering device for accurately timing the decoding operations, a cathode ray tube having a luminescent screen, horizontally deflecting plates and vertically deflecting plates, said horizontally deflecting plates being energized by said preliminary pulses and said vertically deflecting plates being energized by said analog signals produced by said pulse demodulator, a decoding screen bearing the clear representations of the various elements of information and located close to the luminescent screen of the cathode ray tube, an optical system comprising lens elements for positioning the luminous images of the clear representations of the received elements of information, and an electronic reproducer for producing, with said luminous images, a legible picture of all the received information.

2. In the transmitting station of a high speed system for telegraphy in accordance with claim 1, an encoding device comprising a perforator having needles of appropriate shapes, a keyboard controlling the perforator, a paper tape on which said needles perforate, for each element of information to be transmitted; two holes located above each other and slightly shifted from each other, and aligned with them further couples of holes (also above each other and slightly shifted from each other) corresponding (in binary pulse code modulation) to the amplitude of the analog signal corresponding to said element of information, a timing device, an electric motor controlled by said timing device, a rotating mirror, a coil driving said perforated paper tape in a continuous manner at a constant great speed related to the maximum frequency effectively transmitted by the telephone channel connecting the telegraph transmitting and receiving stations, said rotating mirror and said coil being mechanically connected to said motor, a rectilinear luminous source, a cylindrical lens forming the image of said source, after reflection on said rotating mirror, on one face of said perforated paper tape, for optically scanning the holes of said tape, two groups of photoelectric devices located on the other face of said perforated paper tape for collecting the rays of light passing through said holes, the shapes of which are such that said photoelectric devices generate directly the alternating pulses in the form of a pre-distorted period of a sine wave with gradual rise at the beginning of the positive half wave and also at the end of the following negative half wave, whereby a part of the distortion (that the telephone channel connecting the transmitting and receiving telegraph stations would produce on one period of a regular sine wave) is given as a systematic predistortion to each alternating pulse before applying it to said telephone channel, and amplifiers giving to the preliminary pulse an amplitude greater than those of the coded pulses, before their application to the origin of said telephone channel by the electronic mixer.

3. In the transmitting station of a high speed system for remote measuring in accordance with claim 1, an encoding device comprising a plurality of measuring instruments, said local oscillator being stable, a switch controlled by said oscillator for periodically sampling the output voltage of each measuring instrument successively, two beam encoders transforming respectively the odd and the even samples of measured voltage into groups of said coded pulses, an electronic gate controlled and fed by said timing device for producing a preliminary signal before each group of pulses corresponding to each measured voltage, differentiating amplifiers and shaping filters following the latter amplifiers for transforming said signal and said coded pulses into said alternating pulses having predistorted shapes as compared with a period of a regular sine wave, and the amplitude of the preliminary pulse being greater than those of the coded pulses.

4. In the receiving station of a high speed system for telegraphy or for remote measuring in accordance with claim 1: said cathode ray tube comprising a cathode emitting electrons, an accelerating anode, a Wehnelt cylinder, two pairs of said plates for deflecting the electron beam horizontally and vertically, said luminescent screen being phosphorescent, with a duration of phosphorescence of the order of the idle period between two successive sequences of received elements of information, said analog signals being applied to said deflecting plates, an arrangement of triodes and thyratron energized by said preliminary pulses, the output of which is applied to said deflecting plates, a delay line retarding the application of positive pulses (derived from said preliminary alternating pulses) to said cathode and said Wehnelt cylinder, to such an extent that the electron beam impinges on the phosphorescent screen only during a short time exactly at the middle of the duration of the appropriate analog signals, said decoding screen having a plurality of columns made of the clear representations of all the different elements of information, a multilenticular objective located beyond said decoding screen, flashes of phosphorescent light being produced by said phosphorescent screen exactly in front of the desired clear representations of the received elements of information shown by said decoding screen, and said phosphorescent light being integrated on the photosensitive surface of said electronic reproducer during said idle period.

5. In the receiving station of a high speed system for remote measuring in accordance with claim 4: wherein said vertically deflective plates are energized by the analog signals as corresponding to said elements of information, which are samples of results of measurements made in the corresponding transmitting station, said decoding screen having a plurality of columns each made of numbers corresponding to various successive steps of the practical range of variation of the quantities measured by the distant measuring instruments to which said columns are respectively allotted, a light amplifying panel, and comprising an optical system located between said decoding screen and the input surface of said panel, and including said multilenticular objective, cylindrical lenses and a rotating mirror drum, for superposing the images of all the lines of said decoding screen on one line of said input surface of said panel, an electric motor synchronized by positive pulses derived from said received preliminary pulses for moving slowly step-by-step said rotating mirror drum, an alternating current source energizing the electroluminescent layer of panel through an electronic gate, and a pulse counter (fed by said positive pulses) for controlling said latter gate in order to cut off the connection between the alternating current source and the panel for erasing the luminous display of the received results of measurement, so making possible the clear apparition of another display later.

6. In the receiving station of a high speed system for telegraphy or remote measuring in accordance with claim 1: said cathode ray tube comprising a cathode emitting electrons, an accelerating anode, two pairs of said plates for deflecting the electron beam horizontally and vertically, said luminescent screen being fluorescent, with a very short duration of luminescence, and a post-accelerating electrode located close to said fluorescent screen, said analog signals being applied to said deflecting plates, an arrangement of triodes and thyratron energized by said preliminary pulses, the output of which is applied to said deflecting plates, a source of high positive electric potential and an electronic gate inserted between said source and said post accelerating electrode, and a differentiating and rectifying device energized by said analog signals, for producing (during the initial and final transient parts of said analog signals) short electric pulses of appropriate polarity acting on said electronic gate, said decoding screen having a plurality of columns made of the clear representations of all the different elements of information, a multilenticular objective located beyond said decoding screen, said differentiating and rectifying device acting, through electronic gate, on the connection between said source and said post accelerating electrode in such a manner that no undesirable luminous spot is produced on said fluorescent screen during the initial and final transient parts of said analog signals, whereas the desired clear representations of the received elements of information on the decoding screen are well illuminated when said analog signals have their respective maximum amplitudes.

7. In the receiving station of a high speed system for remote measuring in accordance with claim 6: wherein said vertically deflective plates are energized by the analog signals corresponding to said elements of information, which are samples of results of measurements made in the corresponding transmitting station, said decoding screen having a plurality of columns each made of numbers corresponding to various successive steps of the practical range of variation of the quantities measured by the distant measuring instruments to which said columns are respectively allotted, a light amplifying panel, and comprising an optical system located between said decoding screen and the input surface of said panel, and including said multilenticular objective, cylindrical lenses and a rotating mirror drum, for superposing the images of all the lines of said decoding screen on one line of said input surface of said panel, an electric motor synchronized by positive pulses derived from said received preliminary pulses for moving slowly step-by-step said rotating mirror drum, an alternating current source energizing the electroluminescent layer of panel through an electronic gate, and a pulse counter (fed by said positive pulses) for controlling said latter gate in order to cut off the connection between the alternating current source and the panel for erasing the luminous display of the received results of measurement, so making possible the clear apparition of another display later.

8. In the receiving station of a high speed system for telegraphy in accordance with claim 1: said cathode ray tube having two pairs of said plates for horizontally and vertically deflecting the electron beam, said horizontally deflecting plates being energized by the preliminary pulses preceding the received elements of information and said vertically deflecting plates being energized by the analog signals corresponding to said elements of information, which are the different letters, ciphers or signs constituting the transmitted telegram, said decoding screen having a plurality of columns each made of all the possible letters, ciphers or signs black on a transparent background, a motor controlled by said preliminary pulses, an electronic photosensitive printer energized by said motor, a moving sheet of special paper driven by said motor, said sheet having a coating made photosensitive by an ion flow produced by a corona discharge, said printer including a rotating magnet driven by said motor close to said special paper sheet and bearing a mixture of iron powder and fine particles of low melting pigmented resin, a multilenticular objective located between said decoding screen and said photosensitive printer, and producing electrostatic images of the characters of the decoding screen on said special paper previously electrostatically charged and later covered by said rotating magnet with a powder of said particles of pigmented resin which remain only on the pattern of the received characters, and said paper sheet being finally heated for obtaining a permanent image of the received telegram.

9. In the receiving station of a high speed system for telegraphy in accordance with claim 1: said cathode ray tube having two pairs of said plates for horizontally and vertically deflecting the electron beam, said horizontally deflecting plates being energized by the preliminary pulses preceding the received elements of information and said vertically deflecting plates being energized by the analog signals corresponding to said elements of information, which are the different letters, ciphers or signs of the transmitted telegram, said decoding screen having a plurality of columns each made of all the possible letters, ciphers or signs black on a transparent background, an electronic photosensitive printer including a rotating cylinder provided with a photoconductive coating made photosensitive by an ion flow produced by a corona discharge and a sheet of ordinary paper, a motor controlled by said preliminary pulses and rotating said cylinder and moving said sheet close to said cylinder, a multilenticular objective located between said decoding screen and said photosensitive cylinder for producing electrostatic images of the characters of the transmitted telegram on the electrically charged photoconductive coating of the cylinder, which is later dusted by a mixture of small particles of toner carried by sand grains, whereby said electrostatic images are transformed into powder images transferred later to said moving paper sheet previously electrically charged in an appropriate manner, said paper sheet being finally heated in order to obtain a permanently printed picture of the received telegram.

10. In a high speed telegraphic system in accordance with claim 1, a receiving station comprising: a pulse code demodulating device transforming the received preliminary alternating pulses and the combinations of coded pulses corresponding to the various transmitted letters, ciphers or signs into positive pulses and analog signals respectively, a cathode ray tube including a rectilinear cathode, a Wehnelt cylinder, a cylindrical accelerating anode, two pairs of plates for vertically and horizontally deflecting the cathode ray beam, an electrode provided with a central perforated decoding grid constituted by a plurality of groups of small vertical slots located on five horizontal lines of the grid with a maximum of seven slots on each line, each group imitating the shape of one character (letter, cipher or sign) referring to a matrix made of 5 columns of 7 dots each, and a collecting array of groups of seven thin vertical metallic wires located close to said slots in said grid, the seven wires of each group being connected to the seven output terminals of said cathode ray tube, an electrographic printer provided with seven electrodes connected to said output terminals, respectively, and aligned on a transversal line of a paper sheet, a motor driving said sheet in front of said electrodes and synchronized by said positive pulses, a thyratron energized by said positive pulses and producing a saw-tooth electric wave applied to the vertically deflecting plates of the cathode ray tube, while the analog signals are applied to the horizontally deflecting plates, whereby the electronic image of cathode is first positioned below the group of slots of the decoding grid corresponding to the desired character, and later scans electrically said group of slots, slowly upwards and very rapidly downwards, the electric pulses then collected by the collecting array being conveyed through the output terminals of the cathode ray tube to the electrodes of the electrographic printer, and said electrodes throwing on the paper sheet electrical charges building an electrostatic image of the desired character, later transformed into a powdered image by a projector of special powdered ink, said powdered image being finally heated in front of a heated platen in order to obtain on the paper sheet a legible printed picture of the received telegram.

References Cited in the file of this patent

UNITED STATES PATENTS 2,620,394 Valensi ---------------- Dec. 2, 1952
2,732,426 Valensi ---------------- Jan. 24, 1956